United States Patent

Ishigami et al.

[11] Patent Number: 5,933,184
[45] Date of Patent: Aug. 3, 1999

[54] COLOR IMAGE FORMING DEVICE

[75] Inventors: Masahide Ishigami; Shunji Kitagawa; Kouichi Takemura; Satoru Kobayashi; Jun Hirabayashi, all of Kawasaki, Japan

[73] Assignee: Fujitsu Limited, Kanagawa, Japan

[21] Appl. No.: 08/768,567

[22] Filed: Dec. 18, 1996

[30] Foreign Application Priority Data

Dec. 22, 1995 [JP] Japan .................................. 7-335536

[51] Int. Cl.$^6$ ...................................................... B41F 5/16
[52] U.S. Cl. ........................ 347/249; 347/234; 347/248; 347/256; 399/179
[58] Field of Search .................................. 347/248, 250, 347/252, 254, 235, 249, 234, 256; 399/179

[56] References Cited

U.S. PATENT DOCUMENTS

| 4,532,552 | 7/1985 | Uno .......................................... 358/302 |
| 4,717,925 | 1/1988 | Shibata et al. ............................ 347/250 |
| 4,816,844 | 3/1989 | Uchida et al. ............................ 347/116 |
| 5,095,315 | 3/1992 | Takeyama ................................ 347/235 |
| 5,117,243 | 5/1992 | Swanberg et al. ....................... 347/254 |
| 5,610,651 | 3/1997 | Yamakawa et al. ..................... 347/250 |

FOREIGN PATENT DOCUMENTS

| 58-125064 | 7/1983 | Japan . |
| 62-45493  | 2/1987 | Japan . |
| 2-282763  | 11/1990 | Japan . |

*Primary Examiner*—N. Le
*Assistant Examiner*—Hai C. Pham
*Attorney, Agent, or Firm*—Armstrong, Westerman, Hattori, McLeland & Naughton

[57] ABSTRACT

A color image forming device that can certainly correct uniform velocity error associated with the characteristic of each optical system and can realize high-quality color image printing by performing a fine laser beam irradiating position control, in consideration of an error in surface accuracy of each mirror surface of a rotary polygon mirror. The color image forming device includes a storage unit for holding uniform velocity correction data previously created for each mirror surface of a rotary polygon mirror to correct a distortion in expansion or contraction of the electrostatic latent image in the main scanning direction due to the characteristic of an optical system, and an image clock generating unit for reading uniform velocity correction data on each mirror surface used in the rotary polygon mirror at a scanning time out of the storage unit and then generating image clock pulses for image signal creation with a period corresponding to the uniform velocity correction data. The color image forming device is applicable to printers of electro-photographic systems, electrostatic-recording systems, and the like.

12 Claims, 20 Drawing Sheets

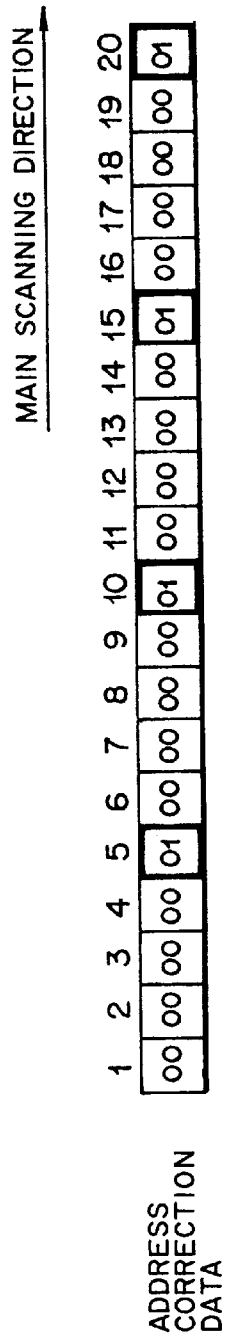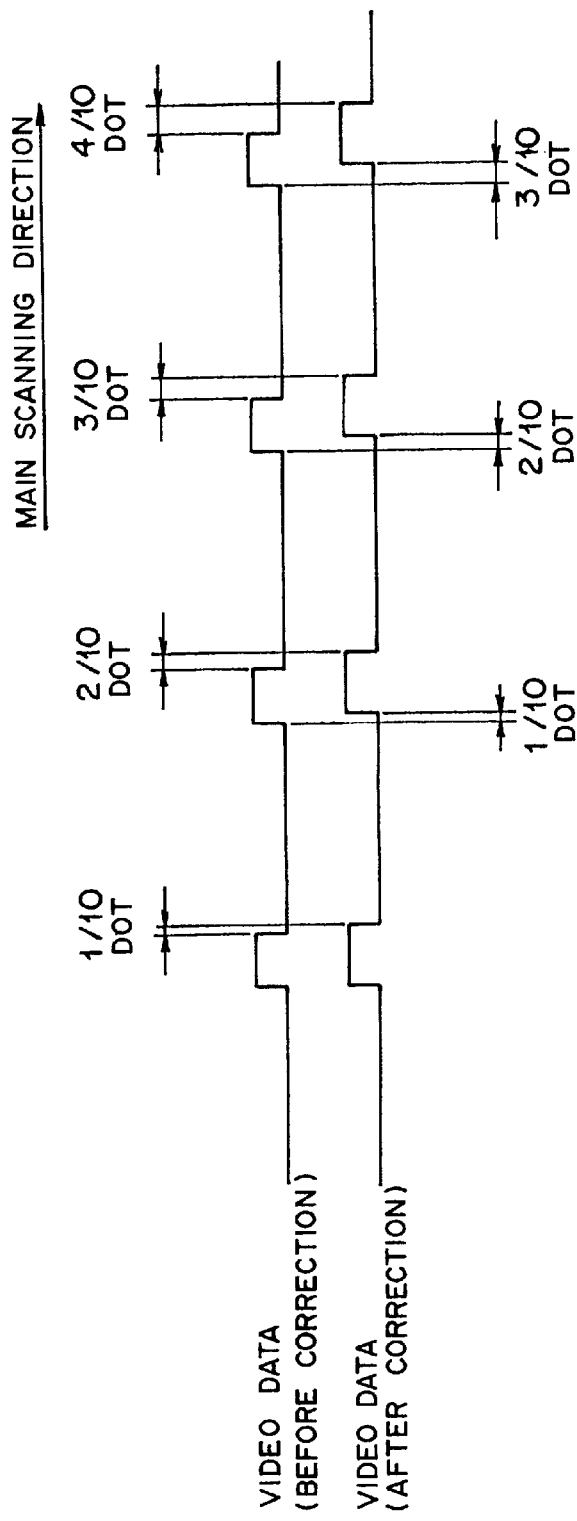

FIG. 12

| | UNIFORM VELOCITY CORRECTION DATA | | |
|---|---|---|---|
| ADDRESS | INCREASE/DECREASE | NUMBER | 40Y, 40M, 40C, 40BL |

| Plane | ADDRESS | INCREASE/DECREASE | NUMBER | Section |
|---|---|---|---|---|
| PLANE 1 | 0 | + | 2 | SECTION 1 |
| | 1 | − | 1 | SECTION 2 |
| | 2 | − | 3 | SECTION 3 |
| | 3 | + | − | SECTION 4 |
| PLANE 2 | 4 | ± | − | |
| | 5 | + | 1 | |
| | 6 | + | 1 | |
| | 7 | + | 1 | |
| PLANE 8 | | | | |
| | 31 | | | |

1 BYTE | 1 BYTE | 2 BYTE

FIG. 16

| | ADDRESS | MAGNIFICATION CORRECTION DATA | | |
|---|---|---|---|---|
| | | INCREASE/ DECREASE | NUMBER | |
| Y | 0 | | | SECTION 1 |
| | 1 | | | SECTION 2 |
| | 2 | | | SECTION 3 |
| | 3 | | | SECTION 4 |
| M | 4 | | | SECTION 1 |
| | 5 | | | SECTION 2 |
| | 6 | | | |
| | 7 | | | |
| C | 8 | | | |
| | 9 | | | |
| | 10 | | | |
| | 11 | | | |
| BL | 12 | | | |
| | 13 | | | |
| | 14 | | | |
| | 15 | | | |
| | 1 BYTE | 1 BYTE | 2 BYTE | |

37

F I G. 18

| ADDRESS | INCREASE/DECREASE | NUMBER | |
|---|---|---|---|
| 0 | + | $\frac{\alpha_0}{2}(=1)$ | SECTION 1 |
| 1 | + | $\frac{\alpha_0}{2}(=1)$ | SECTION 2 |
| 2 | − | $\frac{\beta_0}{2}(=2)$ | SECTION 3 |
| 3 | − | $\frac{\beta_0}{2}(=2)$ | SECTION 4 |

FIG. 19

| | 1 | 2 | 3 | 4 | 5 | 6 | 7 | ... | 15 | 16 | ... | 22 | 23 | 24 | 25 | 26 | 27 | 28 | 29 | 30 | 31 | ... | 40 | |
|---|---|---|---|---|---|---|---|---|---|---|---|---|---|---|---|---|---|---|---|---|---|---|---|---|
| | | | | + | | | + | | − | | | | − | | | − | | | − | | | | | PLANE 1 |
| FIRST BIT | 0 | 0 | 0 | 1 | 0 | 0 | 1 | | 0 | 0 | | 0 | 0 | 0 | 0 | 0 | 0 | | 0 | 0 | 0 | | 0 | |
| SECOND BIT | 0 | 0 | 0 | 0 | 0 | 0 | 0 | | 1 | 0 | | 0 | 1 | 0 | 0 | 1 | 0 | | 1 | 0 | 0 | | 0 | |

COLOR IMAGE FORMING DEVICE

BACKGROUND OF THE INVENTION

1. Field of the Invention

The present invention relates to a device that includes more than one photosensitive body having a surface which is scanned with laser beams to form an electrostatic latent image and that forms a color image on a sheet-like medium by sequentially overlapping and transferring the manifest image (toner image) of each color developed on each photosensitive body, on the sheet-like medium.

2. Description of the Related Art

Generally, in color image forming devices such as electro-photographic printers, a color image is formed on a transfer paper sheet (sheet-like medium) by overlapping images of plural colors (for example, four colors including yellow (Y), magenta (M), cyan (C) and black (BL)). For that reason, the color image forming device includes more than one printing unit to print an image of each color. Images of respective colors are sequentially transferred on a transfer paper sheet conveyed to each of the printing units.

In each of the printing units, a photosensitive body, the entire surface of which is uniformly and electrically charged, is exposed to a laser beam from the optical system to form an electrostatic latent image on the surface. The electrostatic latent image is developed using a developer (toner) of a color corresponding to each printing unit. Then the toner image developed on the photosensitive body is transferred onto the transfer paper sheet conveyed. A color image is formed on a transfer paper sheet by sequentially overlapping a toner image of each color on a sheet of transfer paper in each of the printing units. Finally, the toner image is fixed on the transfer paper sheet.

In such a color image forming device, since an image is completed by overlapping sequentially images of photosensitive bodies on a sheet of transfer paper, it is needed to locate respective color images at the same position. Then generally, various techniques for adjusting an image recording start position or image recording width have been developed as a method of positioning in a main scanning direction to transfer respective color images at the same position on a transfer paper sheet.

For example, in order to adjust an image recording width (or to correct a magnification error), each printing unit forms toner images in at least two positions in the main scanning direction of a transfer belt which conveys transfer sheets. Then the position of each toner image is detected by means of a CCD camera or the equivalents. The magnification error is compensated by adjusting the frequency of image clock pulses for creating an image signal, based on the positional deviation amount between a reference position and the position of a toner image actually formed on the transfer belt, so that image recording widths in the printing units coincide.

In the device that performs a photosensitive exposing process using the above-mentioned laser beam, the fθ characteristics in the optical systems differ with the positional accuracy of each of the lenses (fθ lenses) or mirrors in the optical systems. Therefore, even if the irradiation positions where the laser beams from the optical systems start drawing an image coincide and the irradiation positions where the laser beams from the optical systems finish drawing the image coincide, the laser beams from the optical systems may occupy at different positions in the intermediate region between the starting position and the finishing position, thus causing color slurring in the same region.

In a prior art, as disclosed in the Japanese Laid-Open Patent Publication (Tokkai-Hei) No. 2-282763, for example, a technique is proposed by which color slurring (uniform velocity error) at the portion between the start portion and the end portion of plural images overlapped, which is caused by the differences of fθ characteristics due to the positional accuracies or the like of the optical systems, is corrected by varying the irradiation timing of a laser beam according to the position in the main scanning direction of a deflected laser beam.

The optical system which irradiates laser beams onto a photosensitive body includes a laser light source which is driven according to image signals to emanate laser beams and a rotary polygon mirror (hereinafter, often referred to as a polygon mirror) which deflects the laser beam from the laser light source to scan the surface of a photosensitive body in the main scanning direction using the laser beam.

In the above-mentioned prior-art technique, the uniform velocity errors due to the positional accuracy of each of the lenses or mirrors in the optical systems are corrected, but the characteristic of each of mirror surfaces (mirrors) of the polygon mirror is not considered. It is basically impossible to maintain the surface accuracy of each mirror surface of the polygon mirror in each printing unit at the same level. Improving the surface accuracy leads to an increase in cost of the polygon mirror. However, the error of the surface accuracy cannot be ignored to improve the print quality of color images. Therefore, because of an increasing demand for higher resolution, color-oriented trend and higher quality in recent years, it has been desired to correct certainly uniform velocity error accompanied with the characteristics of each optical system by performing a fine laser beam irradiation position control, in consideration of the surface accuracy error of each mirror surface of the polygon mirror in addition to the positional accuracies of lenses and mirrors in the optical systems.

Originally, in order to correct magnification errors, it is possible to obtain error data taking into account the uniform velocity error by detecting the position of a toner image formed on the transfer belt, as described above. However, it is actually difficult to obtain an error associated with the surface accuracy error of each mirror surface of the polygon mirror based on the toner image on the transfer belt because it must be recognized that with what mirror surface a toner image is drawn.

SUMMARY OF THE INVENTION

The present invention is made to overcome the above mentioned problems. An object of the present invention is to provide a color image forming device that can realize a high quality color image printing operation by performing a fine laser beam irradiation position control, in consideration of the plane accuracy error of each mirror surface of a rotary polygon mirror, and then surely correcting uniform velocity errors due to differences of characteristics among optical systems.

In order to achieve the above objects, according to the present invention, the color image forming device that forms a color image on a sheet-like medium by overlapping images of various colors is characterized by an optical system for emanating a laser beam according to an image signal, being installed for each color; a photosensitive body having a surface on which an exposing process is carried out using a laser beam from the optical system and an electrostatic latent image is formed on the surface according to the image signal, being installed for each color; the optical system including a laser light source for emanating a laser beam according to the image signal, and a rotary polygon mirror for scanning in a main scanning direction on the surface of the photosensitive body by deflecting a laser beam from the laser light source; a storage unit for holding uniform velocity correction data previously created for each mirror surface of the rotary polygon mirror to correct an expansion or contraction distortion of the electrostatic latent image in the main scanning direction due to the characteristic of the optical system; and an image clock generating unit for receiving the uniform velocity correction data regarding each mirror surface used by the rotary polygon mirror at a scanning time from the storage unit and generating a chain of image clock pulses for creating the image signal with a period corresponding to the uniform velocity correction data.

As described above, according to the present invention, the color image forming device can perform a fine laser beam irradiation position control, in consideration of the plane accuracy error of each mirror surface of a rotary polygon mirror, and surely corrects the uniform velocity error due to differences of characteristics among optical systems. Thus, a high quality color image printing operation can be realized effectively.

BRIEF DESCRIPTION OF THE DRAWINGS

FIG. 11(a) is a diagram showing correction data and FIG. 11(b) is a diagram showing resultant image data (video data) corrected according to the correction data;

FIG. 12 is a diagram showing the format of uniform velocity correction data stored in a ROM arranged in an optical system according to the present embodiment;

FIG. 16 is a diagram showing a format of magnification correction data stored in a RAM within a mechanical controller according to the present embodiment;

FIG. 18 is a diagram showing a concrete example of magnification correction data of a predetermined format created by the technique shown in FIG. 17;

FIG. 19 is a diagram showing a concrete example of the case where the uniform velocity correction data shown in FIG. 12 and the magnification correction data shown in FIG. 18 are actually expanded in a RAM within a print controller.

DESCRIPTION OF THE PREFERRED EMBODIMENTS (a) Aspect of the Invention

Figure 1:
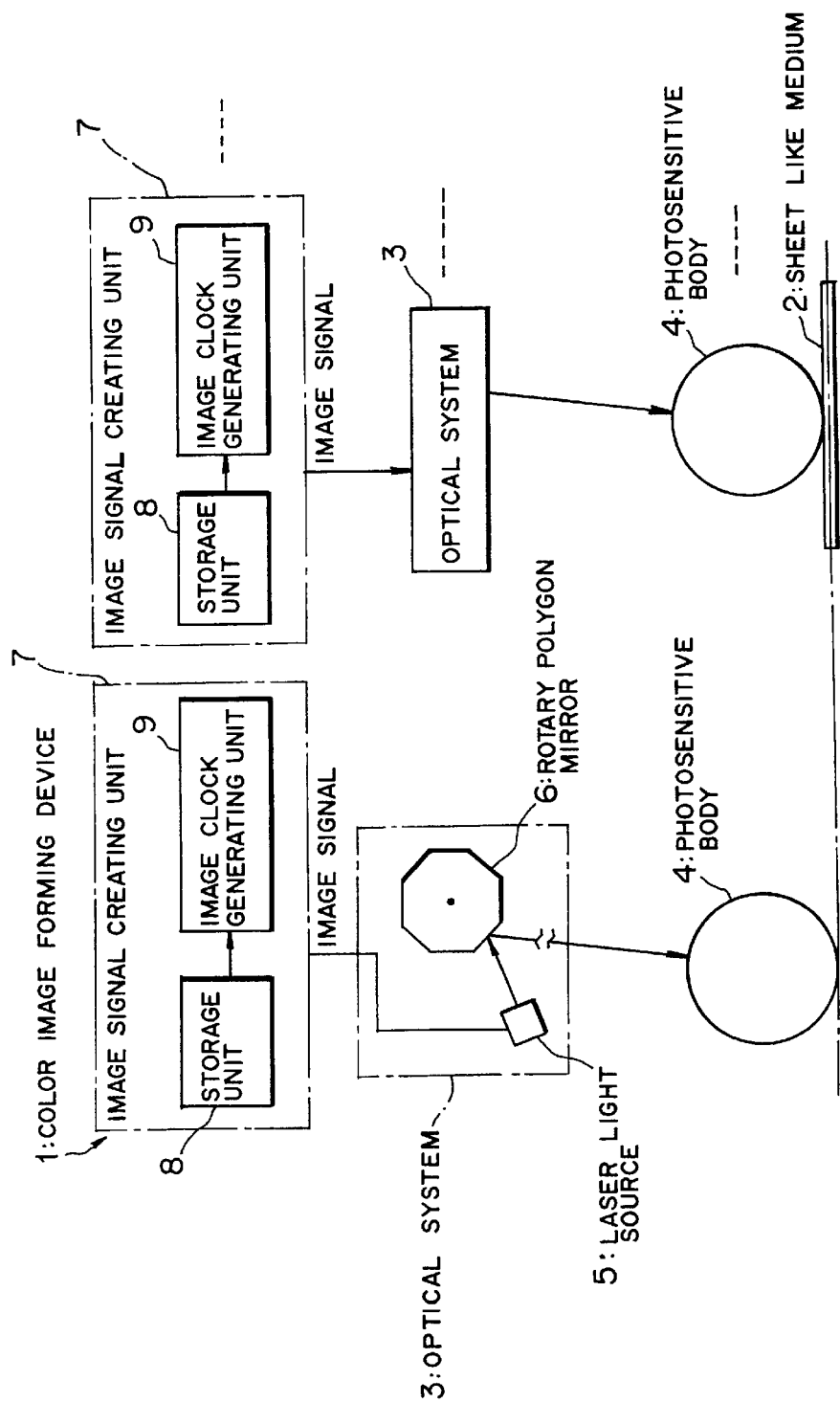
FIG. 1 is a block diagram showing an aspect of the present invention.

FIG. 1 is a block diagram showing an aspect of the present invention. Referring to FIG. 1, in order to form a color image on a sheet-like medium 2 by overlapping images of various colors, the color image forming device 1 of the present invention consists of optical systems 3 each for emitting a laser beam according to an image signal and photosensitive bodies 4 each having a surface on which an electrostatic latent image is formed according to the image signal by exposing with the laser beam from the optical system 3. Each of the optical system 3 and each of the photosensitive bodies 4 are installed for each of the various colors.

Each of the optical systems 3 is formed of a laser light source 5 which emits a laser beam according to an image signal and a rotary polygon mirror 6 which deflects the laser beam from the laser light source 5 to scan the surface of the photosensitive body 4 in the main scanning direction.

The color image forming device 1 also includes an image signal creating unit 7 for each of the optical systems 3. The image signal creating unit 7 creates an image signal to the laser light source 5, and includes a storage unit 8 and an image clock generating unit 9.

The storage unit 8 holds uniform velocity correction data which corrects distortion in expansion or contraction of the electrostatic latent image in the main scanning direction due to the characteristic of the optical system 3. The uniform velocity correction data is previously created for each mirror surface of the rotary polygon mirror 6. In response to uniform velocity correction data from the storage unit 8 regarding each mirror surface used by the rotary polygon mirror 6 at the time of scanning, the image clock generating unit 9 generates a chain of clock pulses for image signal creation with a period corresponding to the uniform velocity correction data. The image signal creating unit 7 creates the image signal according to image clock pulses from the image clock generating unit 9.

The image clock generating unit 9 may selectively generate any one of three types of clock pulses including a clock pulse with a reference period, a clock pulse with a period shorter than the reference period and a clock pulse with a period longer than the reference period, as each of the image clock pulses defining a dot-length in the main scanning direction, based on the uniform velocity correction data. The uniform velocity correction data may be provided to the image clock generating unit 9 every dot as information designating any one of the three types of the clock pulses with the reference period, the short period and the long period.

By dividing all dots formed on the surface of the photosensitive body 4 in the main scanning direction through one scanning operation with each mirror surface of the rotary polygon mirror 6 into more than one section and previously measuring a deviation between an actual boundary position and the reference boundary position of each section before assembling the optical system 3 on the device body, the uniform velocity correction data may be created in a unit of the section based on the deviation.

In this case, the color image forming device 1 may include a uniform velocity correction data holding unit that holds uniform velocity correction data as the number of clock pulses with the short or long period to be generated within each section and an expanding unit that expands data held in the uniform velocity correction data holding unit as uniform velocity correction data designating the type of clock pulse for each dot into the storage unit 8 at a color image forming time.

The expanding unit may expand the uniform velocity correction data held in the uniform velocity correction data holding unit into the storage unit 8 to allocate evenly short or long dots formed according to clock pulses with the short or long period within each section.

In each section, the expanding unit may also expand the uniform velocity correction data held in the uniform velocity correction data holding unit into the storage unit 8 to allocate at random short or long dots formed according to clock pulses with the short or long period at random every time a scanning operation is performed using each mirror surface of the rotary polygon mirror 6.

Further, the expanding unit may expand the uniform velocity correction data held in the uniform velocity correction data holding unit into the storage unit 8 to allocate short or long dots formed according to clock pulses with the short or long period at the same position in the main scanning direction within each section in a same character and to vary at random the allocation positions of the short or long dots in each section every character.

On the other hand, a magnification correction data holding unit that holds magnification correction data may be arranged to correct the magnification error of the electrostatic latent image in the main scanning direction. The expanding unit adds information designating a clock pulse with the short or long period to a dot which a clock pulse with the reference period is designated according to uniform velocity correction data, based on the magnification correction data read out of the magnification correction data holding unit. The expanding unit piles up the magnification correction data on the uniform velocity correction data in the storage unit 8.

In this case, the color image forming device 1 may include an image photographing unit that photographs images formed at more than one position in the main scanning direction on a conveying belt for the sheet-like medium 2 by means of each of the photosensitive bodies 3 and a magnification correction data creating unit that finds a variation in interval in the main scanning direction of the images photographed on the conveying belt by means of the image photographing unit and forms magnification correction data based on the variation and then stores the same in the magnification correction data holding unit. In addition, the magnification correction data may be held as the number of clock pulses with the short or long period to be generated within each section, in the magnification correction data holding unit.

The image clock generating unit 9 selectively generates either a clock pulse with a short period or a clock pulse with a long period as each of image clock pulses defining a dot-length in the main scanning direction, based on the uniform velocity correction data. The uniform velocity correction data is provided every dot as information designating either a clock pulse chain with the short or long period. The uniform velocity correction data alternately designating a clock pulse with the short period and a clock pulse with the long period causes the image clock generating unit 9 to generate the image clock pulses in a reference state. The uniform velocity correction data continuously designating a clock pulse with the short period or a clock pulse with the long period causes the image clock generating unit 9 to generate the image clock pulses in a state expanded or contracted to the reference state.

In the color image forming device 1 according to the present invention shown in FIG. 1, the image clock generating unit 9 reads uniform velocity correction data regarding each mirror surface used in the rotary polygon mirror 6 at the scanning time out of the storage unit 8 and then generates image clock pulses for image signal creation of a period corresponding to the uniform velocity correction data. Hence, a fine laser beam irradiation position control can be performed in consideration of the surface accuracy error of each mirror surface of the rotary polygon mirror 6.

The image clock generating unit 9 outputs selectively the image clock pulses for image signal creation with the reference period, short period or long period, based on the uniform velocity correction data. Therefore, dots acting as an image having a length in the main scanning direction according to the period of each image clock pulse are formed, and uniform velocity correction in the main scanning direction is performed. In this case, the uniform velocity correction data can be created by adding information (2-bit data) designating the type of clock pulse every dot.

The uniform velocity correction data, in which the characteristic of the optical system 3, particularly, the surface accuracy error of each mirror surface of the rotary polygon mirror 6 is taken into account, can be created by creating uniform velocity correction data in section unit, based on the deviation between an actual boundary position and the reference boundary position measured in the main scanning direction every section, with respect to each mirror surface of the rotary polygon mirror 6.

In this case, the data amount to be stored can be largely compressed by holding the uniform velocity correction data as the number of clock pulses of a short period or long period to be generated in each section in the uniform velocity correction data holding unit.

In order to expand the uniform velocity correction data by means of the expanding unit, the short dots or long dots are evenly arranged in each section by allocating evenly short dots or long dots in each section, so that it can be prevented that unevenness occurs in the printed color image.

Further, in the expansion of uniform velocity correction data by means of the expanding unit, the short dots or long dots are evenly arranged in each section by allocating at random them in each section every time a scanning operation is carried out using each mirror surface of the rotary polygon mirror 6. Thus, occurrence of unevenness in a color image formation is prevented while appearance of the moire fringe can be prevented.

Further, in the expansion of uniform velocity correction data by means of the expanding unit, the short dots or long dots are allocated at the same position in each section in the same character while the allocation positions of the short dots or long dots allocated in each section every character are varied at random. Thus, a printed character is prevented from being distorted while appearance of the moire fringe can be prevented.

On the other hand, the expanding unit adds information designating a clock pulse with the short or long period to dots to which a clock pulse with the reference period is designated according to the uniform velocity correction data, based on the magnification correction data read out of the magnification correction data holding unit. Hence, both the magnification correction and the uniform velocity correction can be performed simultaneously by piling up the magnification correction data on the uniform velocity correction data in the storage unit 8, without affecting information for uniform velocity correction.

In this case, the image photographing unit and the magnification correction data creating unit can obtain a variation in interval in the main scanning direction of images on the conveying belt during a job waiting period in a device operation. Thus, the magnification correction data can be formed according to the variation. The data amount to be held can be largely compressed by holding the magnification correction data as the number of clock pulses of the short period or long period to be generated in each section in the magnification correction data holding unit.

When the image clock generating unit 9 generates selectively the image clock pulses for image signal creation with a short period or long period, one reference length can be realized using a short dot and a long dot according to a set of a clock pulse with the short period and a clock pulse with the long period. Thus, the status where a length of an image formed of two consecutive dots is shorter than the reference length can be realized by continuously generating clock pulses with the short period while the status where a length of an image formed of two consecutive dots is longer than the reference length can be realized by continuously generating clock pulses with the long period. In this case, uniform velocity correction data can be created by providing one bit data as information designating the type of clock pulse every dot, whereby the data amount can be reduced.

As described above in detail, according to the color image forming device 1 of the present invention, a fine laser beam irradiation position control can be performed in consideration of the surface accuracy error of each mirror surface of the rotary polygon mirror 6. Since the uniform velocity error due to differences of characteristic among optical systems 3 can be surely corrected, the color image printing can be effectively realized in a high quality.

Dots each having a length in the main scanning direction according to the period of the image clock pulse can be formed by outputting selectively the image clock pulse with a reference period, short period and long period. Hence, uniform velocity correction data can be easily created merely by providing information (2-bit data) designating the type of the image clock pulse every dot. As a result, the uniform velocity in the main scanning direction can be easily and accurately corrected.

Further, the uniform velocity correction data can be easily created for each section in the main scanning direction with respect to each mirror surface of the rotary polygon mirror 6, in consideration of an error of the surface accuracy of each mirror surface.

At that time, the stored data amount can be largely compressed by holding the uniform velocity correction data as the number of clock pulses of the short period or long period to be generated in each section. This feature contributes to reduction of the memory capacity and the device cost.

Since the short dots or long dots are evenly arranged in each section by allocating equally the short dots or long dots in each section, it can be prevented that unevenness occurs in the printed color image. Hence, the print quality of a color image can be reserved while the uniform velocity correction can be performed.

The short dots or long dots are evenly arranged in each section by allocating at random the short dots or long dots every time a scanning operation is performed using each mirror surface of the rotary polygon mirror 6. Thus it can be prevented that unevenness occurs in the printed color image and that a moire fringe occurs in the printed color image. As a result, the print quality of a color image can be reserved while the uniform velocity correction can be performed.

Further, by allocating the short dots or long dots at the same position in each section in the same character and varying at random the allocation positions of the short dots or long dots allocated in each section every character, it can be prevented that a printed character is distorted and that the moire fringe occurs. Hence, the print quality of a color image can be reserved while the uniform velocity correction can be performed.

On the other hand, since information designating a clock pulse with the short period or long period is added to dots to which a clock pulse with the reference period is designated according to the uniform velocity correction data, based on the magnification correction data, the magnification correction data is piled up on the uniform velocity correction data, without affecting information for uniform velocity correction. Therefore, both the magnification correction and uniform velocity correction can be simultaneously and surely performed. This feature contributes to an improved print quality of a color image.

In this case, a deviation between an image forming position formed on the conveying belt and a reference position can be obtained during a job waiting duration of the device in operation. The magnification correction data can be created corresponding to the deviation. Thus, the mounting errors of the optical systems 3 as well as the magnification error caused by deformation of the device frame associated with environmental changes can be surely corrected at any time. This feature contributes to a further improved print quality of a color image.

The data amount to be held can be greatly compressed by holding the magnification correction data as the number of clock pulses of a short period or long period to be generated in each section in the magnification correction data holding unit. Hence, this feature contributes to reduction of memory capacity as well as reduction of the device manufacturing cost.

By selectively generating an image clock pulse for image signal creation with a short period or long period and handling two consecutive dots as one unit to form an image with a length equal to or longer/shorter than the reference length, the uniform velocity correction data can be created merely by adding one bit data used as information designating the type of clock pulse to each dot. This feature contributes to further reducing the amount of data.

EMBODIMENTS OF THE INVENTION

The embodiments of the present invention will be described below by referring to the attached drawings. In the present embodiment, the case where the present invention is applied to an electro-photographic printer will be explained below.

Figure 2:
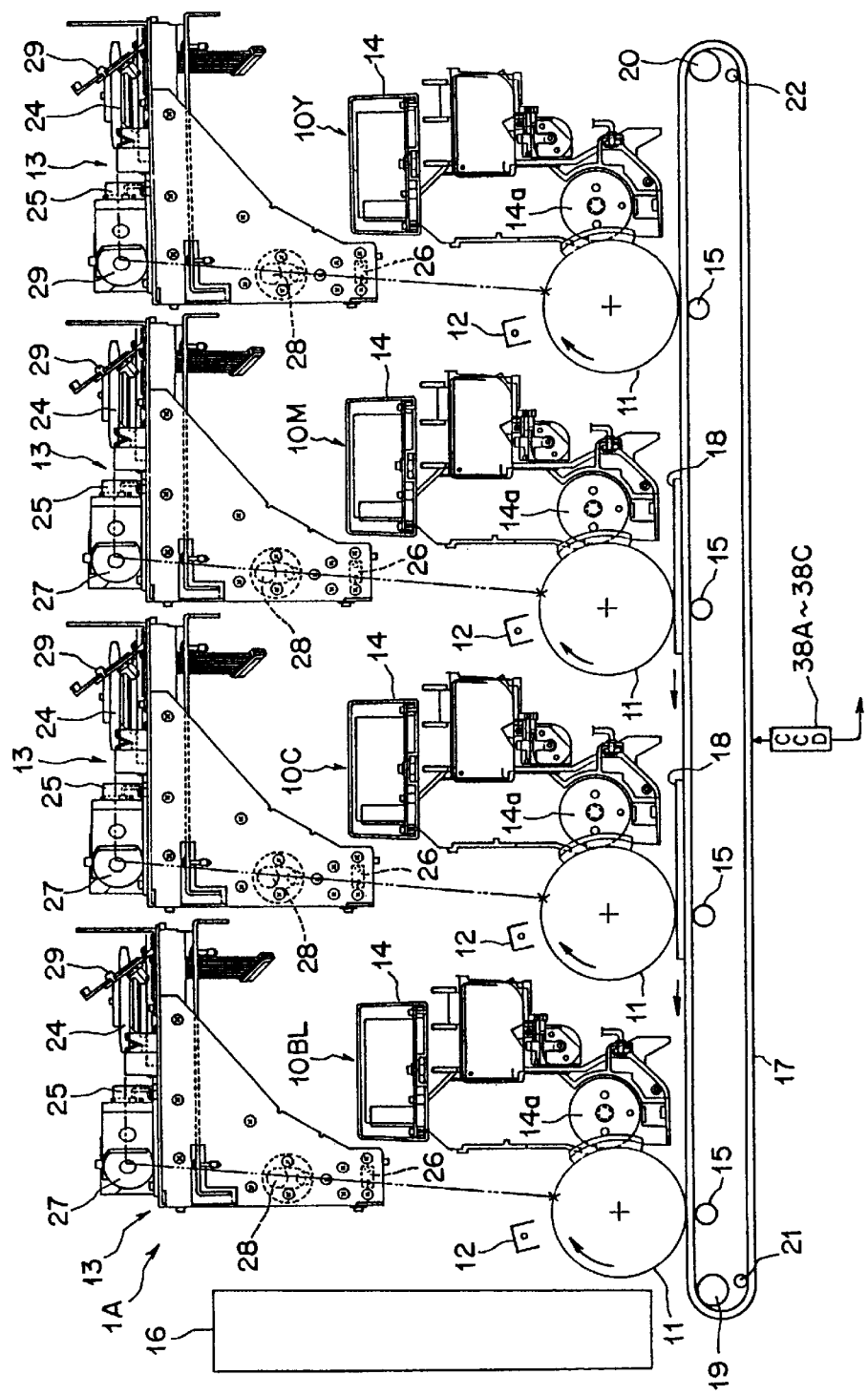
FIG. 2 is a side view showing the internal configuration of a color image forming device according to an embodiment of the present invention.

FIG. 2 is a side sectional view showing the internal configuration of a color image forming device according to an embodiment of the present invention. As shown in FIG. 2, according to the present embodiment, the electro-photographic printer 1A includes four printing units 10Y, 10M, 10C and 10BL, each which prints a color image on a transfer paper sheet (sheet-like medium) 18, a fixer 16, and an endless transfer belt (conveying belt such as an electro-static adsorption belt) 17 of a resin for conveying transfer paper sheets 18.

The printing unit 10Y consists of a photosensitive body 11, a pre-charger 12, an optical unit (optical system, laser scanning mechanism) 13, a developer 14, and a transfer roller 15 so that a toner image of yellow (Y) can be transferred on a transfer paper sheet 18. The printing unit 10M consists of a photosensitive body 11, a pre-charger 12, an optical unit (optical system, laser scanning mechanism) 13, a developer 14, and a transfer roller 15 so that a toner image of magenta (M) can be transferred on a transfer paper sheet 18. The printing unit 10C consists of to a photosensitive body 11, 12, pre-charger 12, an optical unit (optical system, laser scanning mechanism) 13, a developer 14, and a transfer roller 15 so that a toner image of cyan (C) can be transferred on a transfer paper sheet 18. The printing unit 10BL consists of a photosensitive body 11, a pre-charger 12, an optical unit (optical system, laser scanning mechanism) 13, a developer 14, and a transfer roller 15 so that a toner image of black (BL) can be transferred on a transfer paper sheet 18. The printing units 10Y, 10M, 10C and 10BL are arranged nearly horizontally and in parallel along the conveying belt 17.

The photosensitive body 11 is rotatably driven by means of a drive motor (not shown). The pre-charger 12 electro-statically charges evenly the surface of the photosensitive body 11. The optical unit 13 projects an image light onto the surface of the photosensitive body 11 according to the recorded information (information regarding print data). The optical unit 13 exposes the surface of the photosensitive body 11 in a pattern according to print data to form an electrostatic latent image.

The developer 14 develops the electrostatic latent image formed on the surface of the photosensitive body 11. In actual, the development is made by supplying toner on the surface of the photosensitive body 11 by means of the developing roller 14a and then forming a toner image being a visible image. The transfer roller 15 is arranged so as to confront the photosensitive body 11 through the transfer belt 17 (that is, a transfer paper sheet 18). The toner image on the photosensitive body 11 is transferred onto the transfer paper sheet 18 by sandwiching the transfer paper sheet 18 conveyed with the transfer belt 17 between the transfer roller 15 and the photosensitive body 11.

Further, when a transfer paper sheet 18 on which a toner image of each color is transferred by each of the printing units 10Y, 10M, 10C and 10BL is fed, the fixer 16 fixes the toner image on the transfer paper sheet 18 to the transfer paper sheet 18 under heat, pressure, or light.

On the other hand, the transfer belt 17 is endlessly wound around the drive roller 19, the follower roller 20, and the tensioning roller (tensioners) 21 and 22. The transfer belt 17 is driven by transmitting the rotational drive force of a drive motor (not shown) by means of the drive roller 19. The transfer paper sheet 18 electrostatistically charged by a charger (not shown) is adsorbed on the outer surface (the surface confronting the photosensitive body 11). Thus the transfer paper sheet 18 is sequentially conveyed to the printing units 10Y, 10M, 10C and 10BL.

In the electro-photographic printer 1A, the transfer paper sheet 18 is fed to the transfer belt 17. Then the transfer paper sheet 18 conveyed by the transfer belt 17 is sent to the fixer 16 through the printing units 10Y, 10M, 10C and 10BL. When the transfer paper sheet 18 passes through the printing units 10Y, 10M, 10C and 10BL, a toner image of each color (Y, M, C, BL) is transferred onto the transfer paper sheet 18. While the transfer paper sheet 18 is passing through the fixer 16, the toner image is fixed on the transfer paper sheet 18. As described above, when printing has been made by sequentially overlapping different colors in the printing units 10Y, 10M, 10C and 10BL, a color image is formed on the transfer paper sheet 18.

Figure 3:
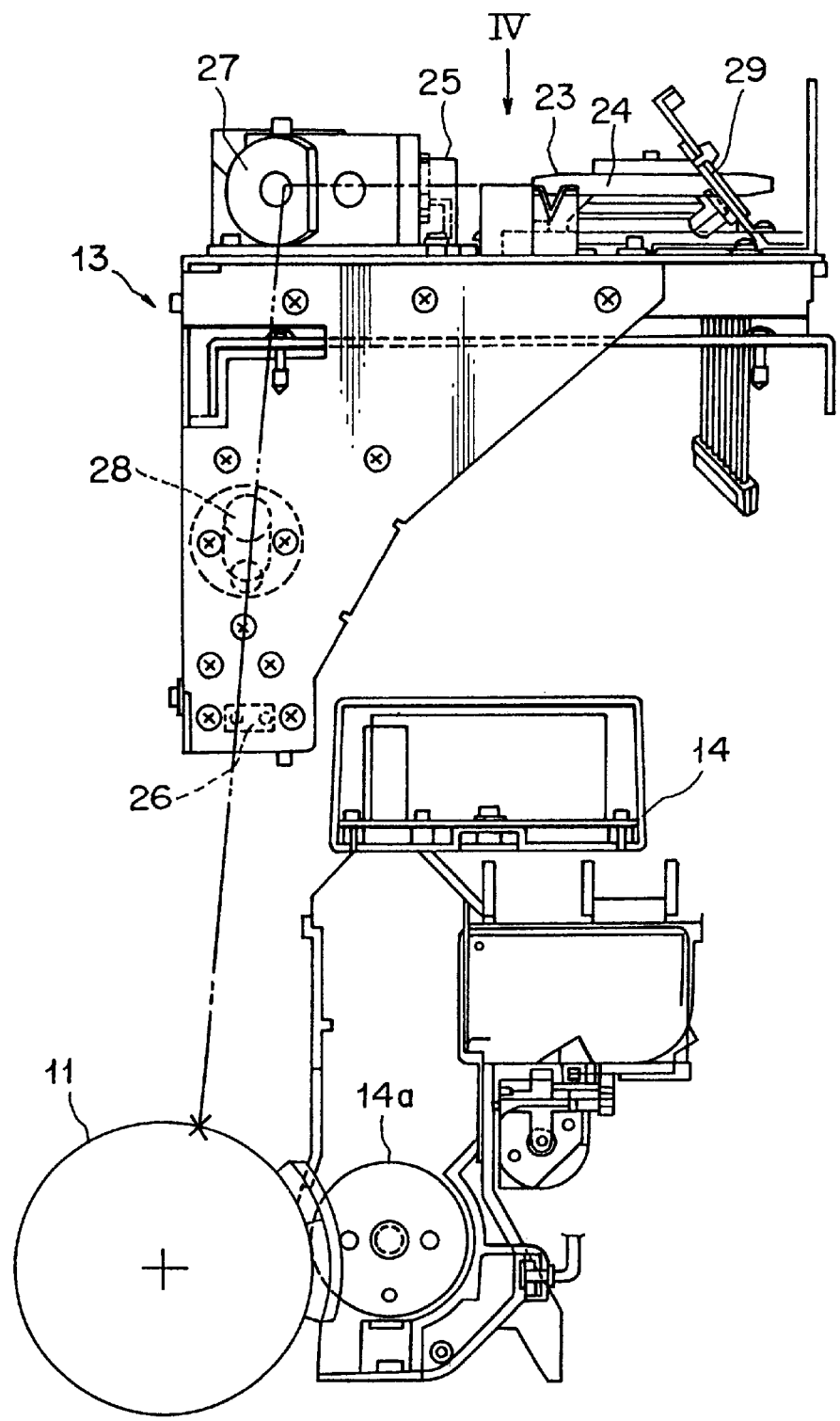
FIG. 3 is a side view showing the configuration of an optical system (laser scanning mechanism) according to the present embodiment.
Figure 4:
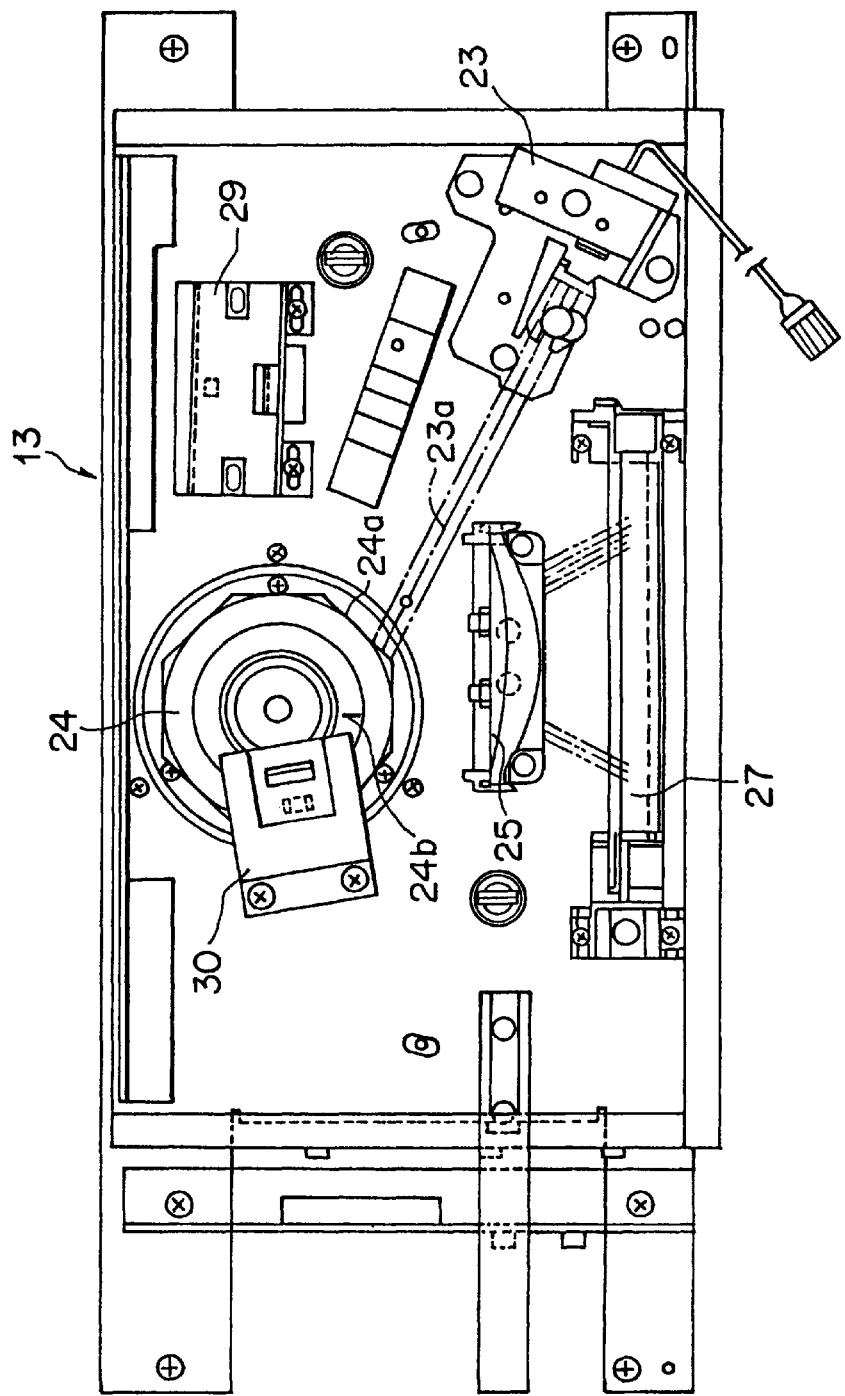
FIG. 4 is a plan view (a view taken in the direction of arrow IV in FIG. 3) showing the configuration of an optical system (laser scanning mechanism) according to the present embodiment.

In each of the printing units 10Y, 10M, 10C and 10BL, the optical unit 13 is formed as shown in FIGS. 2 to 4. FIG. 3 is a side sectional view showing a configuration of the optical unit 13 according to the present embodiment. FIG. 4 is a plan view (a view taken in the direction of arrow IV in FIG. 3) showing a configuration of the optical unit 13 according to the present embodiment.

As shown in FIGS. 2 to 4, the optical unit 13 consists of a laser unit 23, a polygon mirror 24, fθ lenses 25 and 26, a loop-back mirror 27, a record start position detecting mirror 28, a beam detector (BD) 29 and a home position sensor (HPS) 30.

The laser unit (laser light source) 23 consists of a semiconductor laser (LD) for generating laser beams, and a collimating lens for collimating a laser beam from the semiconductor laser and then emitting the collimated laser beam as a beam 23a to the polygon mirror 24.

The polygon mirror (rotary polygon mirror) 24 which has 8 mirror surfaces 24a on the outer periphery thereof is rotatably driven by means of a motor (not shown). With the rotation of the polygon mirror, the polygon mirror 24 scans the surface of the photosensitive body 11 in the main scanning direction with the laser beam by deflecting the laser beam 23a from the laser unit 23 by means of each of the mirror surfaces 24a.

After the laser beam deflected by the polygon mirror 24 passes through the fθ lens 25, it is horizontally reflected toward the photosensitive body 11 by means of the loop-back mirror 27. Thus the laser beam focuses on the photosensitive body 11 through the fθ lens 26. The fθ lenses 25 and 26 are mounted to scan the photosensitive body 11 with the laser beam deflected by the polygon mirror 24 in the main scanning direction and at a uniform velocity.

The record start position detecting mirror 28 is mounted on the record starting side of the main scanning direction in the optical unit 13 to detect the record start position of a laser beam. The record start position detecting mirror 28 reflects the reflected light from the loop-back mirror 27 to the beam detector 29 outside the scanning area of the photosensitive body 11. The beam detector 29 is formed, for example, of a PIN photo-diode. In order to maintain the record start position in each main scanning direction, the beam detector 29 detects the reflected light from the record start position detecting mirror 28 every scanning operation and then generates a synchronous detection signal.

Further, the home position sensor 30 detects optically the mark 24b marked on the upper surface of the polygon mirror 24 and then outputs a detection signal every time the mark 24b is detected. It can be specified with what mirror surface 24a of the polygon mirror 24 the scanning is performed based on the detection signal from the home position sensor 30.

Figure 5:
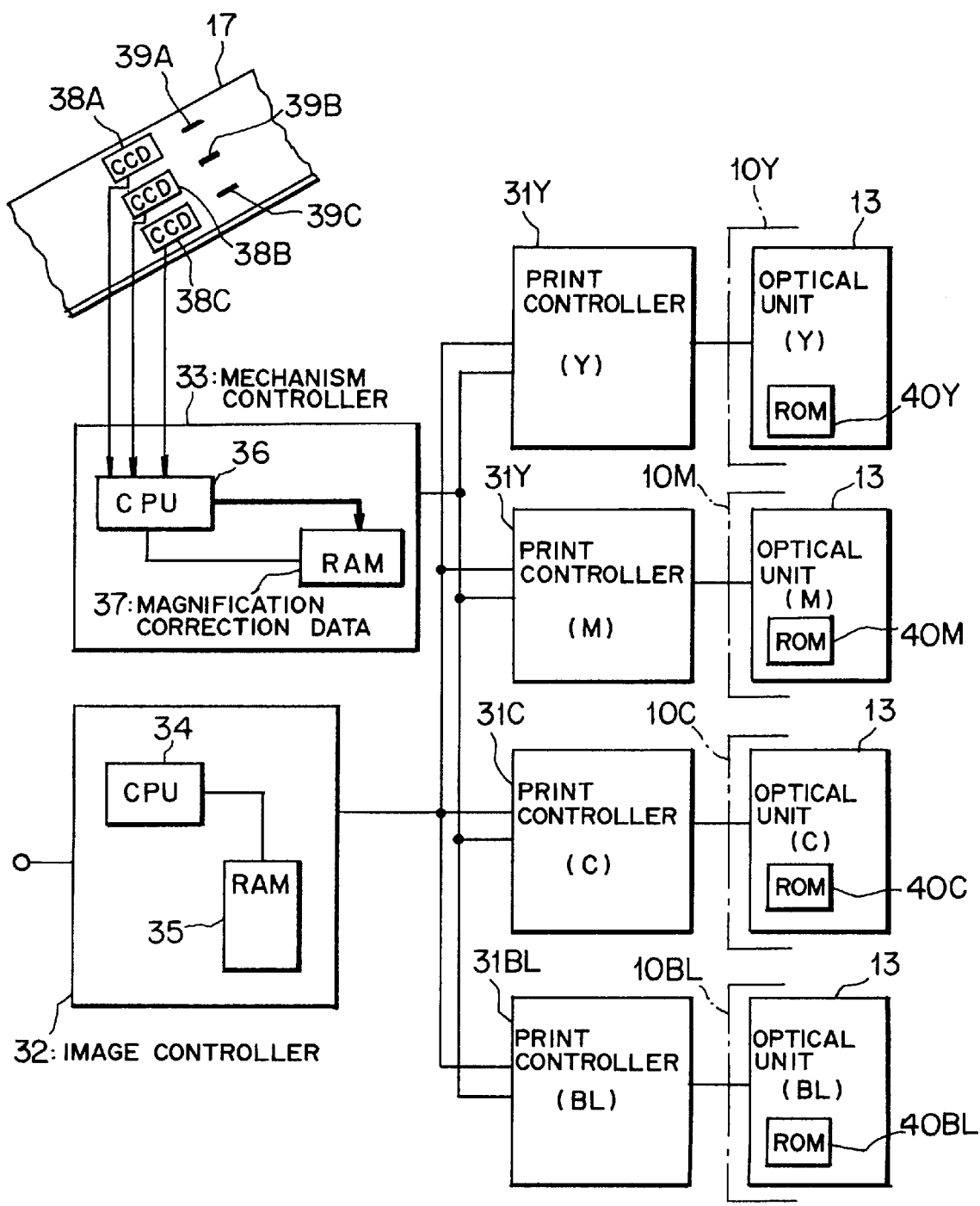
FIG. 5 is a block diagram showing the configuration of a control system according to the present embodiment.
Figure 6:
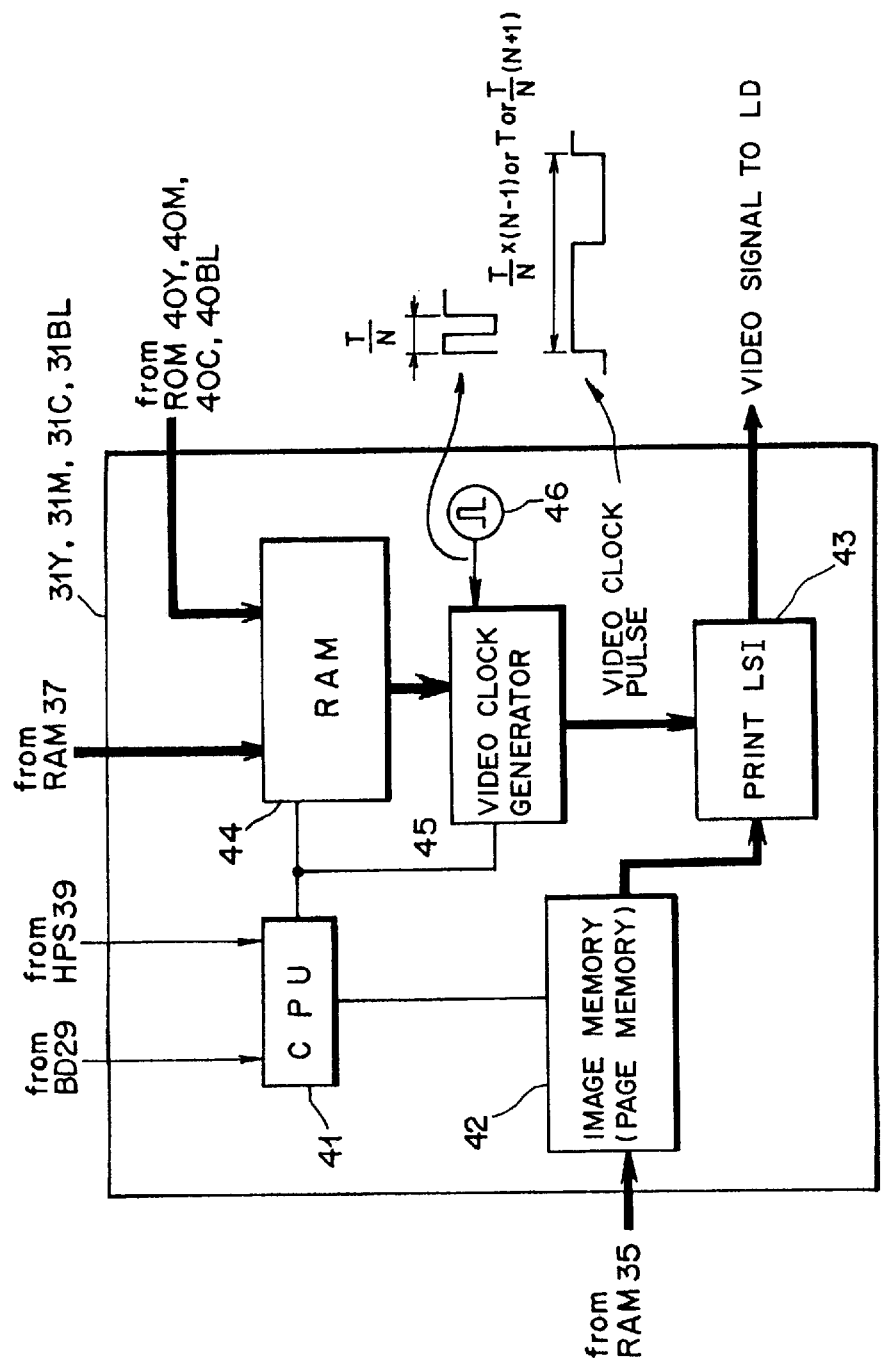
FIG. 6 is a block diagram showing the configuration of a print controller according to the present embodiment.

Next, the control system of controlling the electrophotographic printer 1A of the present embodiment will be described by referring to FIGS. 5 and 6. FIG. 5 is a block diagram showing the configuration of the control system. FIG. 6 is a block diagram showing the detail configuration of each of the print controllers 31Y, 31M, 31C and 31BL shown in FIG. 5.

As shown in FIG. 5, the control system in the electrophotographic printer 1A of the present embodiment consists of print controllers 31Y, 31M, 31C and 31BL, an image controller 32 and a mechanism controller 33.

Each of the print controllers 31Y, 31M, 31C and 31BL is formed as described later with FIG. 6. The operation of the optical unit 13 in each of the print units 10Y, 10M, 10C and 10BL (the lighting operation of the laser unit 23 and the rotational operation of the polygon mirror 24) is controlled by each print controller 31Y, 31M, 31C, and 31BL, respectively.

The image controller 32 consists of a CPU 34 and a RAM 35. In response to print information or print instruction from the upper devices, the CPU 34 creates data regarding an image to be printed in each color (Y, M, C, BL) in the RAM 35 to form a color image on a transfer paper sheet 18 based on the print information and then produces print data regarding each color created in the RAM 35 to the print controllers 31Y, 31M, 31C and 31BL, together with a print instruction.

The mechanism controller 33 is formed of a CPU 36 and a RAM 37. The mechanism controller 33 controls the mechanical operation (such as the conveying operation of the transfer belt 17) in the electro-photographic printer 1 according to the present embodiment and sets the resolution of the optical unit 13 or LD power via the print controllers 31Y, 31M, 31C and 31BL.

The CPU 36 in the mechanism controller 33 is connected to three CCD cameras (image photographing units) 38A to 38C. The CPU 36 acts as a magnification correction data creating unit that creates magnification creation data to compensate the magnification error of an electrostatic latent image in the main scanning direction, based on the results photographed by the CCD cameras 38A to 38C.

The CCD cameras 38A to 38C, as shown in FIG. 2, are arranged in the middle of the endless transfer belt 17 returning back from the side of the fixer 16 to the side of the printing unit 10Y. The CCD cameras 38A to 38C photograph from underneath images 39A to 39C of different colors formed at three positions in the main scanning direction on the transfer belt 17 by means of the printing units 10Y, 10M, 10C and 10BL, respectively.

As described later with FIGS. 17 and 18, the CPU 36 finds a variation of the space between the images 39A to 39C in the main scanning direction which are formed on the transfer belt 17 photographed by the CCD cameras 38A to 38C during the job waiting period in the device operation. The magnification correction data is created in real time based on the variation. The magnification correction data created by the CPU 36 is stored in the RAM 37 acting as a magnification correction data holding unit in the format (to be described later with FIGS. 16 and 18).

In the printing unit 10Y, the optical unit 13 includes a ROM (uniform velocity correction data holding unit) 40Y. In the printing unit 10M, the optical unit 13 includes a ROM (uniform velocity correction data holding unit) 40M. In the printing unit 10C, the optical unit 13 includes a ROM (uniform velocity correction data holding unit) 40C. In the printing unit 10BL, the optical unit 13 includes a ROM (uniform velocity correction data holding unit) 40BL. Each of the ROMs 40Y, 40M, 40C and 40BL stores uniform velocity correction data created by the technique (to be described later with FIG. 8) in a format (to be described later with FIG. 12).

On the other hand, each of the print controllers 31Y, 31M, 31C and 31BL, as shown in FIG. 6, includes a CPU 41, an image memory (page memory) 42, a print LSI 43, a RAM 44, a video clock generator 45 and an oscillator (OSC) 46.

The CPU 41 manages comprehensively internal sections in each of the print controllers 31Y, 31M, 31C and 31BL and acts as an expanding unit (to be described later).

The image memory 42 holds print data for one page regarding each color transferred from the image controller 32.

The print LSI 43 converts print data held in the image memory 42 into a video signal (image signal) according to video clock pulses (image clock pulses) from the video clock generator 45 and then outputs the converted and created video signal to the laser unit 23 (LD) in each optical unit 13. A dot (electrostatic latent image) of a length elongated in the main scanning direction corresponding to the period of each video clock is formed on the photosensitive body 11 by scanning the photosensitive body 11 in the main scanning direction by means of the laser beam from the laser unit 23 (LD) driven according to the video signal.

Figure 7:
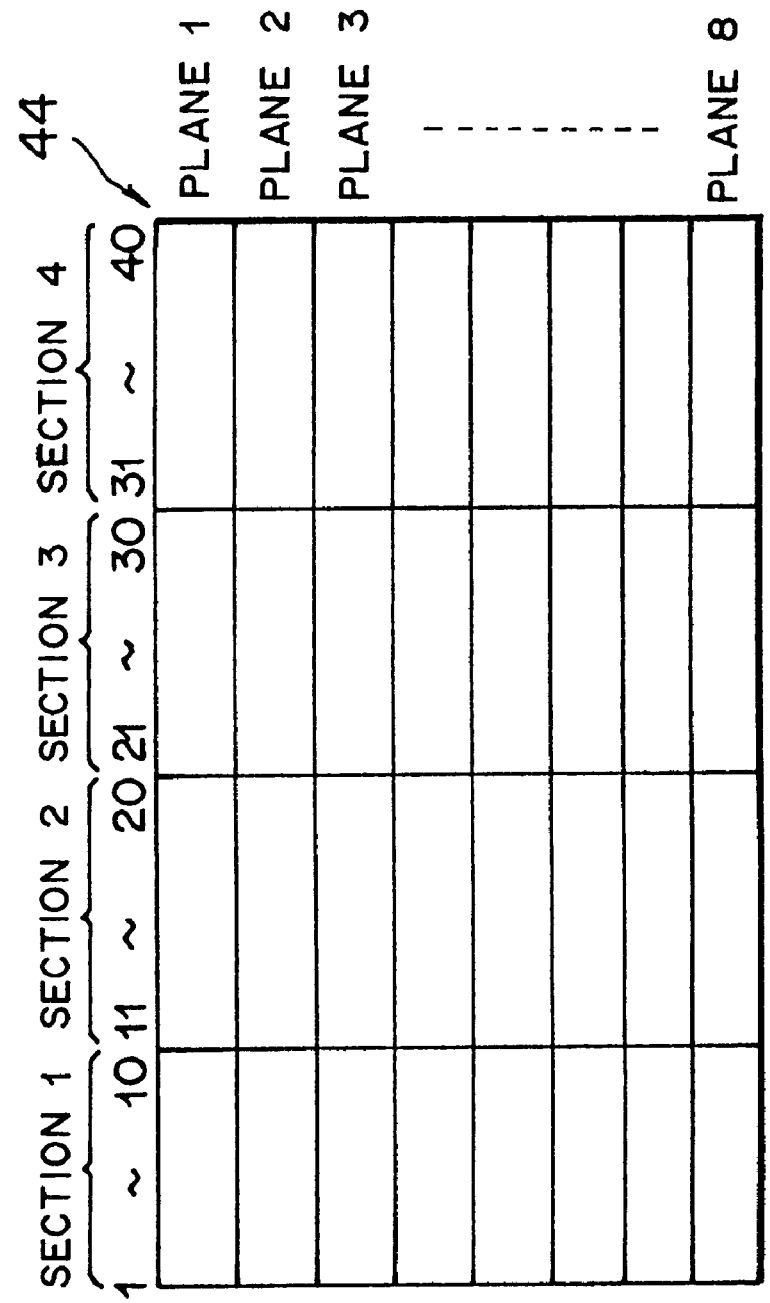
FIG. 7 is a diagram showing a correction data storage format of a RAM (storage unit) in a print controller according to the present embodiment.

The RAM (storage unit) 44 which holds correction data holds information (2-bit data) designating the type of clock pulse (to be described later) for each dot created in the main scanning direction, for example, shown in FIG. 7. FIG. 7 shows all 40 dots formed in the main scanning direction, divided in four sections.

The RAM 44 stores uniform velocity correction data which corrects the deviation in expansion or contraction in the main scanning direction of an electrostatic latent image due to the characteristic of each optical unit 13 previously created for each mirror surface 24a of the polygon mirror 24 and magnification correction data which is stored in the RAM 37 within the mechanism controller 33, in the state expanded and overlapped for each of the mirror surfaces 24a (surface 1 to surface 8) of the polygon mirror 24.

In response to correction data regarding each mirror surface 24a used in the polygon mirror 24 output from the RAM 44 every one scanning operation, the video clock generator (image clock generating unit) 45 generates a video clock pulse (an image clock pulse for image signal creation) with the period corresponding to the correction data (uniform velocity correction data and magnification correction data).

Figure 9:
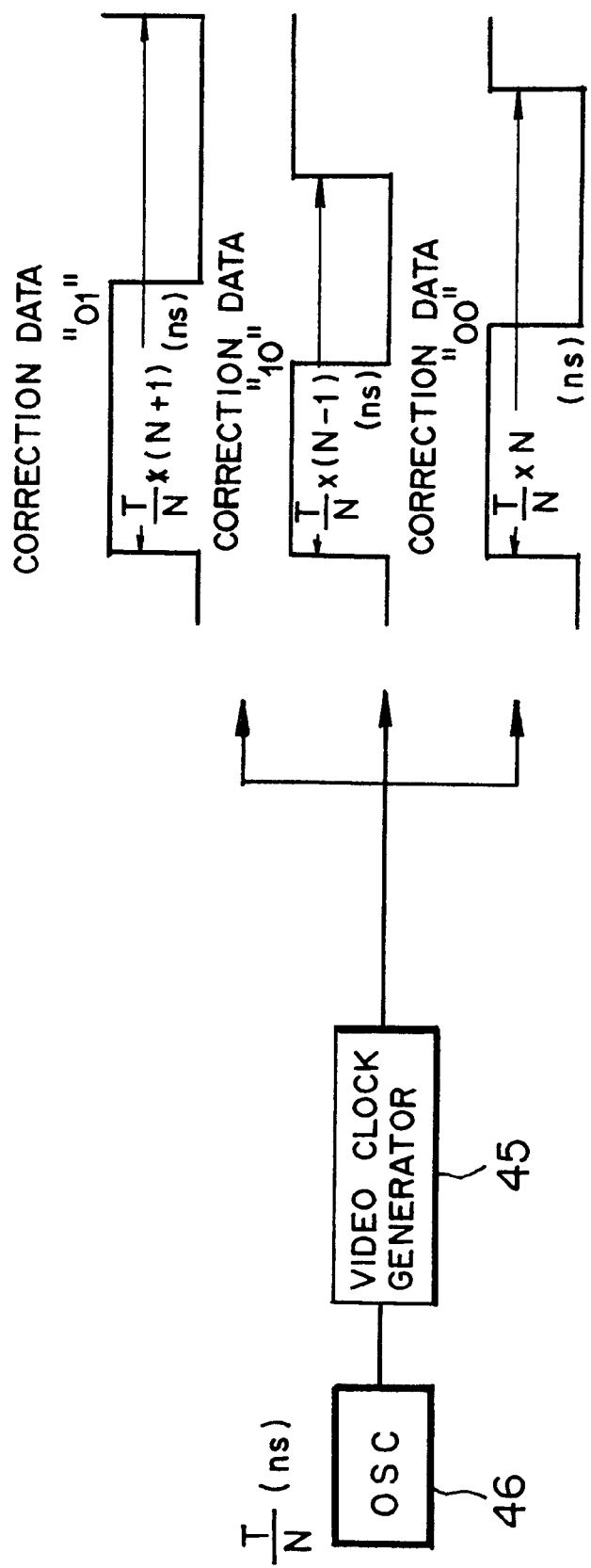
FIG. 9 is a diagram showing an example of an image clock pulse generated by a video clock generator (image clock generating unit) according to the present embodiment.

By frequency-dividing an original clock pulse of a period T/N from the oscillator 46, the video clock generator 45 generates selectively any one of three types of clock pulses of period defining the dot-length in the main scanning direction, for example, including a clock pulse with a reference period T, a clock pulse with a period $((T/N) \times (N-1))$ shorter than the reference period T, and a clock pulse with a period $((T/N) \times (N+1))$ longer than the reference period T, as shown in FIG. 9.

The correction data for each dot held in RAM 44 is 2-bit data. For example, in the correction data "00", a clock pulse with the reference period T is output as a video clock pulse from the video clock generator 45 to the print LSI 43. In the correction data "01", a clock pulse with the long period ((T/N)×(N+1)) is output as a video clock pulse from the video clock generator 45 to the print LSI 43. In the correction data "10", a clock pulse with the short period ((T/N)×(N−1)) is output as a video clock pulse from the video clock generator 45 to the print LSI 43.

In the present embodiment, in each of the ROMs 40Y, 40M, 40C and 40BL, the uniform velocity correction data, as described later with FIG. 12, is held as the number of clock pulses of the short or long period to be generated in each section. The magnification correction data stored in the RAM 37 is held as the number of clock pulses of the short or long period to be generated in each section, as described later with FIGS. 16 and 18.

In this case, the CPU 41 acts as an expanding unit that expands either the uniform velocity correction data read out of each of the ROMs 40Y, 40M, 40C and 40BL or the magnification correction data read out of the RAM 37 in the ROM 44 at a color image forming time.

Figure 14:
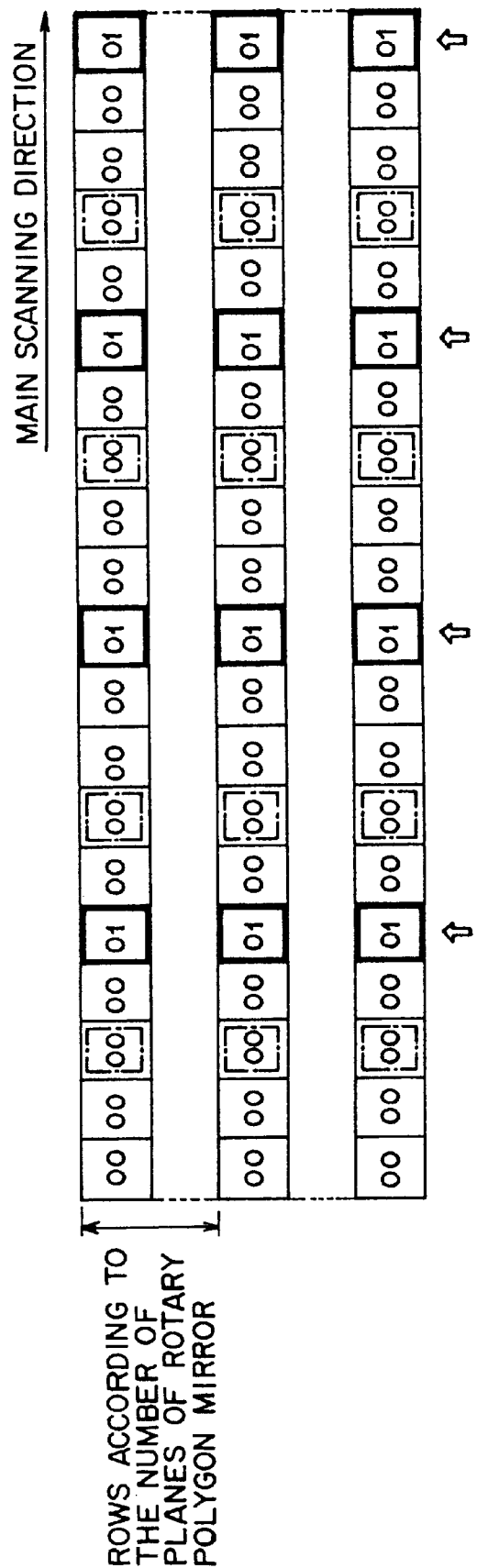
FIG. 14 is a diagram showing the state of a chain of dots formed according to uniform velocity correction data of the present embodiment.

That is, the CPU 41 expands the uniform velocity correction data from each of the ROMs 40Y, 40M, 40C and 40BL as 2-bit data designating the type of clock pulse for each dot in RAM 44 and adds information designating a clock pulse of the short or long period to a dot to which a clock pulse with the reference period is designated according to uniform velocity correction data based on the magnification correction data from the RAM 37, as described later with FIG. 14. Thus the CPU 41 expands the magnification correction data in the ROM 44 to pile up it on the uniform velocity correction data.

Further the CPU 41 specifies a mirror surface 24a used in the polygon mirror 24 at one scanning time according to a detection signal from the HPS 30 and then reads the correction data (uniform velocity correction data and magnification correction data) regarding the specified mirror surface 24a out of the RAM 44, thus supplying it to the video clock generator 45. Moreover, the CPU 41 controls the video clock generator 45 to generate a video clock pulse, based on the correction data from the RAM 44, in synchronous with the synchronous detection signal from BD 29.

Next, referring to FIG. 8, the procedure of creating uniform velocity correction data for each mirror surface 24a of the polygon mirror 24 in the present embodiment will be explained below.

Figure 8:
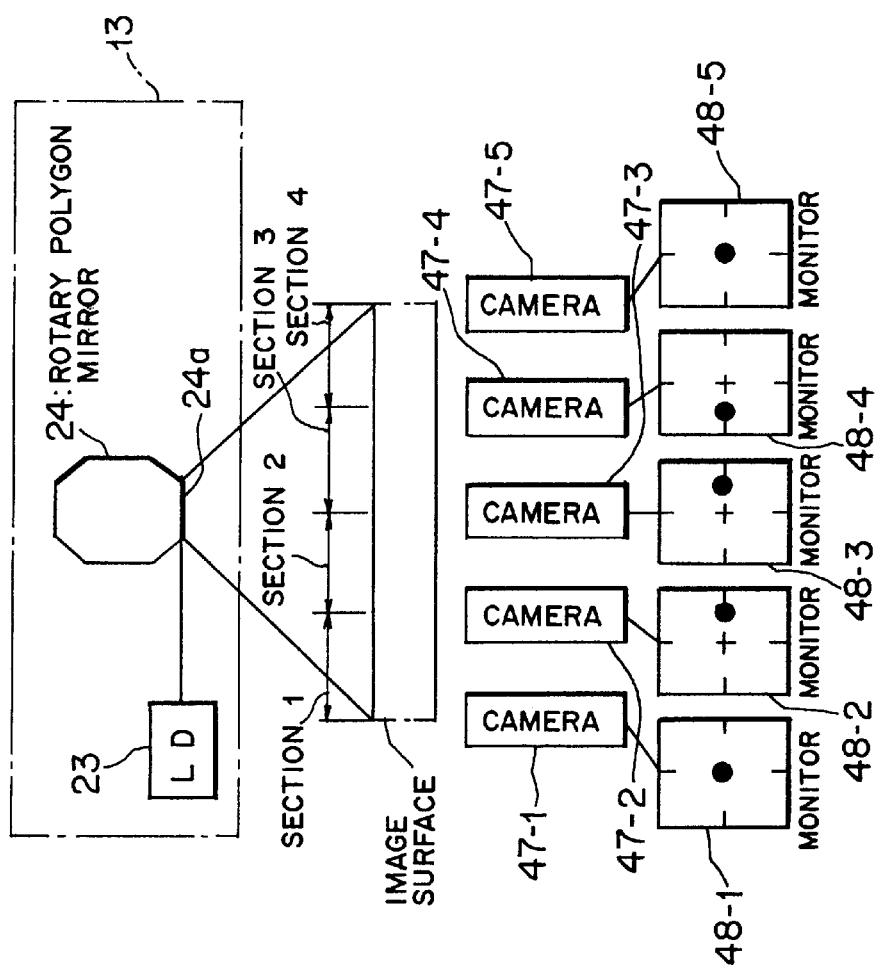
FIG. 8 is a diagram used for explaining a technique of creating uniform velocity correction data for each of the mirror surfaces of a polygon mirror (rotary polygon mirror) according to the present embodiment.

As shown in FIG. 8, before being assembled to the device body, the optical unit 13 of each color is fixed to five cameras 47-1 to 47-5 of which the physical position of the image photographing surface is predetermined. The positional relationship between the image photographing surface of each of the five cameras 47-1 to 47-5 and the optical unit 3 corresponds to the positional relationship between the position where the laser beam from the optical unit 13 mounted to the device body focuses on the photosensitive body 11 and the position of the optical unit 13. The positions (reference boundary positions) of five cameras 47-1 to 47-5 arranged in the main scanning direction define the section including all dots formed in the main scanning direction. In the example shown in FIG. 8, the positions of the five cameras 47-1 to 47-5 divide all dots in the main scanning direction into four sections 1 to 4.

After the optical unit 13 is arranged as shown in FIG. 8, the scanning operation is performed using each mirror surface 24a of the polygon mirror 24. A laser beam (spotlight) for one dot is emitted from the optical unit 13 to each of the cameras 47-1 to 47-5 at the scanning positions corresponding to the positions (reference boundary positions) of five cameras 47-1 to 47-5 arranged in the main scanning direction. In this case, the cameras 47-1 to 47-5 are arranged in such a manner that if the actual scanning position of the optical unit 13 agrees with the reference boundary position, the spotlight photographed by each of the cameras 47-1 to 47-5 lies in the center of each of the monitors 48-1 to 48-5 respectively connected to the cameras 47-1 to 47-5.

Therefore, the deviation of the photographing position of the spotlight from the reference boundary position can be measured by performing an image process of the spotlight for one dot photographed by each of the cameras 47-1 to 47-5.

In the example shown in FIG. 8, the reference boundary positions defined by the cameras 47-1 and 47-5 agrees with the image pick-up positions of the spotlights. However, the actual boundary position between the sections 1 and 2 is shifted by one dot toward the section 2 at the reference boundary position defined by the camera 47-2 due to the surface accuracy error of the mirror surface 24a used for scanning and the uniform velocity error of the fθ lenses 25 and 26. The actual boundary position between the sections 2 and 3 is shifted by one dot toward the section 3 at the reference boundary position defined by the camera 47-3. The actual boundary position between the sections 3 and 4 is shifted by one dot toward the section 3 at the reference boundary position defined by the camera 47-4.

That is, provided that the section 1 defined by the cameras 47-1 and 47-2 is contracted by one dot and that the section 3 defined by the cameras 47-3 and 47-4 is extended by two dots and that the section 4 defined by the cameras 47-4 and 47-5 is contracted by one dot, the spotlight for one dot photographed by the cameras 47-1 to 47-5 falls on the centers of the monitors 48-1 to 48-5 respectively.

According to the present embodiment, in order to perform such a correction, the uniform velocity data which designate the kind of clock pulse (with the reference period, the short period, and the long period) to be output from the video clock generator 45 every dot are respectively created for each of the mirror surfaces 24a (surfaces 1 to 8) of the polygon mirror 24 in each optical unit 13, based on the above-mentioned deviation, and then is stored in each of the ROMs 40Y, 40M, 40C and 40BL.

Therefore, the width of each of sections 1 to 4 becomes the interval (interval of the reference boundary position) preset with a constant number of dots by reading uniform velocity correction data from each of the ROMs 40Y, 40M, 40C and 40BL to the RAM 44 and driving the laser unit 23 (LD) according to the uniform velocity correction data corresponding to the mirror surface 24a of the polygon mirror 24. As a result, the laser beam can be emitted at an accurate position (a position in the main scanning direction), without being adversely affected by various errors such as the surface accuracy error of each mirror surface 24a of the polygon mirror 24 and the uniform velocity error of the fθ lens 25 or 26.

Next, the uniform velocity correction data will be explained below in more detail.

In the present embodiment, as described by referring to FIG. 9, the video clock generator 45 generates selectively any one of a clock pulse with the reference periods T, a clock pulse with the short period ((T/N)×(N−1)) and a clock pulse with the long period ((T/N)×(N+1)). The print LSI 43 varies the laser emitting time for one dot, that is, the dot-length for one dot in the main scanning direction, according to the selected clock period.

When "00" is provided as correction data (2-bit data) to a dot, the clock pulse with the reference period T is selected for the dot to form a dot of a reference length on the photosensitive body 11. When "01" is provided as correction data to a dot, the clock pulse with the long period ((T/N)× (N+1)) is selected for the dot to form a dot of a length longer than the reference length (or a long dot) on the photosensitive body 11. When "10" is provided as correction data to a dot, the clock pulse with the short period ((T/N)×(N−1)) is selected for the dot to form a dot of a length shorter than the reference length (or a short dot) on the photosensitive body 11.

Addition of the correction data to each dot allows the deviation in each of the sections 1 to 4 above-described to be absorbed.

Figures 10A, 10B, 10C:
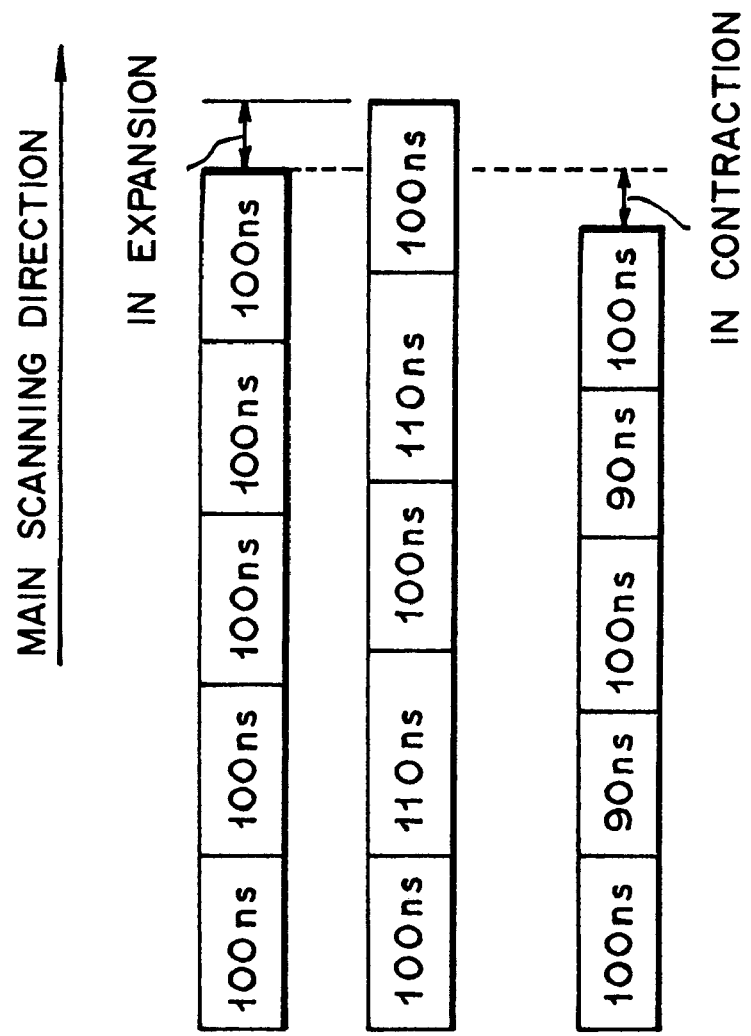
FIGS. 10(a) to 10(c) are diagrams each showing expanded image data and contracted image data after correction with respect to image data (video data) before correction.

For example, it is assumed that T=100 MHz, N=10, and "00", "01", "00", "01" and "00" are respectively added as correction data to five continuous dots. Before correction, all dots have the reference length corresponding to the laser emitting time of 100 ns, as shown in FIG. 10(*a*). After correction based on the correction data, a dot having the reference length corresponding to the laser emitting time of 100 ns and a dot having a long dot corresponding to the laser emitting time of 110 ns are alternately formed as shown in FIG. 10(*b*). As a result, the entire length of five dots (the laser emitting time) extends by 20 ns, compared with that before the correction.

When "00", "10", "00", "10" and "00" are respectively added as correction data to five continuous dots, a dot having the reference length corresponding to the laser emitting time of 100 ns and a dot having a long dot corresponding to the laser emitting time of 90 ns are alternately formed as shown in FIG. 10(*c*). As a result, the entire length of five dots (the laser emitting time) is contracted by 20 ns, compared with that before the correction.

When the uniform velocity correction data is created according to the technique explained with FIG. 8, an ideal uniform velocity correction can be performed by arranging the cameras corresponding to all the dots lined in the main scanning direction. However, it is impossible to realize such a situation. In the present embodiment, all dots lined in the main scanning direction are divided into more than one section. The uniform velocity correction data is created in a section unit. The expansion and contraction correction is performed in a section unit.

In that case, the CPU 41 functioning as an expanding unit expands the uniform velocity correction data output from each of the ROMs 40Y, 40M, 40C and 40BL in the RAM 44 to allocate equally short dots or long dots in each section. For example, like the example above-mentioned, it is assumed that T=100 MHz, that N=10, and that one section of 20 dots in the entire length is expended by 4/10 dots. In this case, 2-bit data "00" and "01" designating a clock pulse for each dot are expanded in the addresses 1 to 20 of the RAM 44, as shown in FIG. 11(*a*).

That is, in order to expand by 4/10 dots in the range of 20 dots, four dots among 20 dots are formed as long dots. The 2-bit data "01" designating a long dot is set to, for example, addresses 5, 10, 15 and 20 to distribute equally (at equal intervals) four long dots in the range of 20 dots.

Thus, as shown in FIG. 11(*b*), the length of the section extends by 4/10 dots in the main scanning direction after correction. As described above, unevenness which occurs in a printed color image can be prevented by allocating and arranging evenly long dots (or short dots) in each section. As to a dot designating the 2-bit data "01", FIG. 11(*b*) shows the main scanning direction forming positions and the lengths in the main scanning direction before and after the correction.

On the other hand, FIG. 12 shows a concrete format of uniform velocity correction data held in each of the ROMs 40Y, 40M, 40C and 40BL. As shown in FIG. 12, the uniform velocity correction data is held as the number of clock pulses of the short or long period to be generated in each section. Here, for example, the number of all dots formed through one scanning operation is 40. All the dots are divided into four sections 1 to 4 each formed of 10 dots.

That is, both increase/decrease information (1 byte) designating expansion or contraction of each section and information (2 byte) regarding the number of long dots or short dots to be set in a section when a section is expanded or contracted are held as the uniform velocity correction data in the addresses 0 to 31 designating the four sections 1 to 4 for each mirror surface 24*a* (surfaces 1 to 8) of the polygon mirror 24.

As described above, since it is unnecessary to hold 2-bit data each dot by holding as number of long dots or short dots in each section (that is, the number of clock pulses of a short period or long period to be generated in each section) the uniform velocity correction data, the volume of data to be held can be greatly compressed. Here, as one example, the number of dots formed through one scanning operation is 40. However, the number of dots actually reaches several thousands. This holding technique is very effective to reduce the amount of data to be held.

In the column of increase/decrease information shown in FIG. 12, the sign + represents expanding a section while the sign − represents contracting a section. The sign ± represents that expansion and contraction are not carried out in a section.

Figure 13:
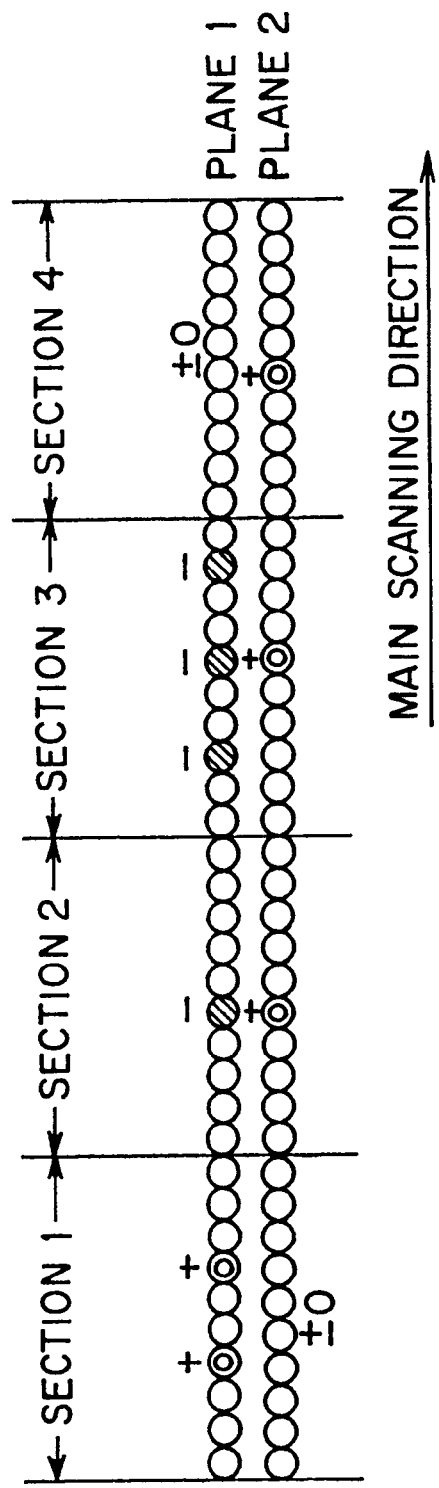
FIG. 13 is diagram showing the state of a chain of dots actually formed according to the uniform velocity correction data shown in FIG. 12.

FIG. 12 shows uniform velocity correction data forming two long dots in the section 1 (address 0) for the surface 1, one short dot in the section 2 (address 1) for the surface 1, three short dots in the section 3 (address 2) for the surface 1 and one long dot in each of the sections 2 to 4 of the surface 2. FIG. 13 shows the status of a dot row in the main scanning direction formed actually by expanding uniform velocity correction data in the RAM 44 by means of the CPU 41 and then generating video clock pulses according to the uniform velocity correction data by means of the video clock generator 45. As shown in FIG. 13, in the dot row according to the surface 1, two long dots (each represented with a double circle) are equally arranged in the section 1. One short dot (represented with a circle slashed) is arranged in the section 2 nearly in the center of the section 2. Three short dots are evenly arranged in the section 3. In the dot row according to the surface 2, one long dot is arranged nearly to the center of each of the sections 2 to 4. In FIG. 13, white circles represent dots each having a reference length.

In the example described above, the case where long dots or short dots are evenly allocated and arranged in each section is shown. However, in that case, when long dots or short dots are always arranged at the same positions in each section of a dot row formed by means of the same mirror surface, the portion (shown with an arrow) where long dots are arranged sometimes looks like a moire fringe, as shown, for example, in FIG. 14 (20 dots per section).

Figure 15:
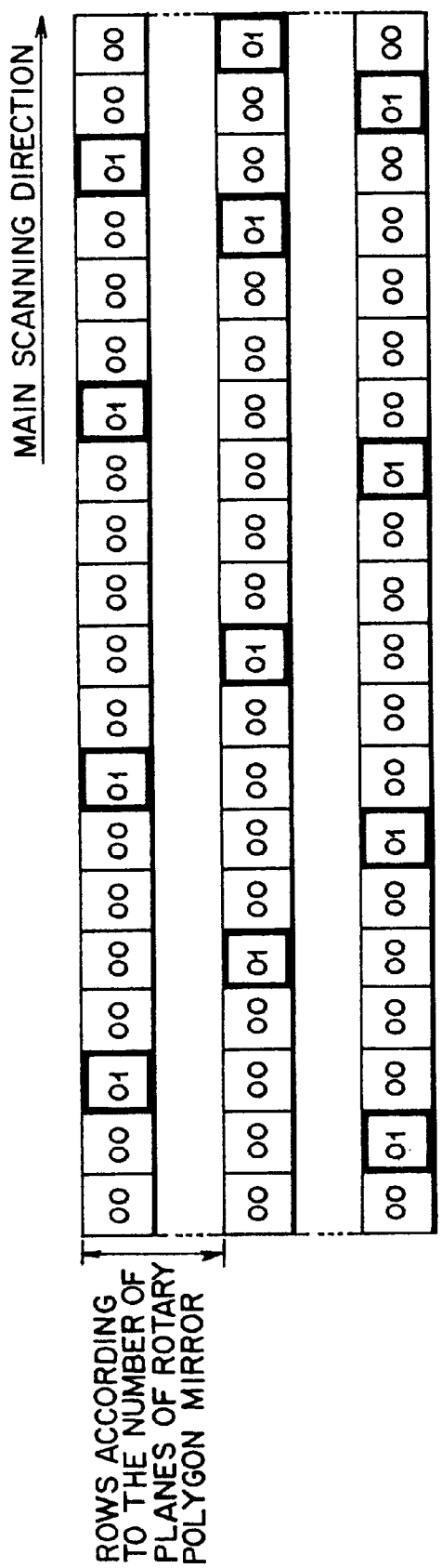
FIG. 15 is a diagram showing the state of a chain of dots with a dot-length changed portion arranged at random according to uniform velocity correction data of the present embodiment.

For example, as shown in FIG. 15, when the CPU 41 expands the uniform velocity correction data stored in each of the ROMs 40Y, 40M, 40C and 40BL in the RAM 44, short dots or long dots can be allocated at random every time a scanning operation is performed with each mirror surface 24*a* of the polygon mirror 24. Thus it can be prevented that the moire fringe appears in a resultant color image. The uniform velocity correction can be performed while the print quality of a color image can be reserved.

Further, when short dots or long dots are allocated at random in one character, as described above, the outline of the character may be distorted. Hence, when the CPU 41 expands the uniform velocity correction data stored in each of the ROMs 40Y, 40M, 40C and 40BL in the RAM 44, the short dots or long dots can be allocated at the same positions in each section of the same character and can be varied at random the allocation positions of short dots or long dots in each section for each character. Therefore, it can be prevented that a print character is distorted while appearance of a moire fringe can be prevented. Further, the uniform velocity correction can be performed while the print quality of a color image can be reserved.

As described above, using uniform velocity correction data created by the technique shown in FIG. 8, the deviation of the laser beam irradiation position caused by the surface accuracy error of each surface 24a of the polygon mirror 24 and the uniform velocity error of fθ lenses 25 and 26 can be absorbed. However, since the mounting error of the optical unit 13 as well as the deviation (magnification error) caused by the device frame deformation with environmental changes (changes in temperature, moisture, or the like) influences the focus distance of a laser beam, the entire print width is expanded or contracted. Hence, some pieces of uniform velocity data cannot correct the deviation.

In the present embodiment, the CPU 36 in the mechanism controller 33 creates independently the magnification correction data to correct the magnification error and then stores it in the RAM 37. At the color image forming time, the CPU 41 in each of the print controllers 31Y, 31M, 31C and 31BL piles up the magnification correction data stored in the RAM 37 on the uniform velocity correction data expanded in the RAM 44 as information ("10" or "01") designating a clock pulse with the short period or long period.

Dots (e.g. dots shown with chain lines in FIG. 14) to which the clock designation information is added according to the magnification correction data are predetermined at a constant ratio to all dots formed through one scanning operation. In other words, addresses to which data other than "00" are set according to the uniform velocity correction data as well as addresses to which data other than "00" are set according to the magnification correction data are previously allocated in the RAM 44.

Thus, the clock designation information according to the magnification correction data is added the dots to which a clock pulse with the short period or long period is designated according to the uniform velocity correction data. The magnification correction data is piled up on the uniform velocity correction data in the RAM 44, whereby the magnification correction and the uniform velocity correction are achieved simultaneously without affecting information for performing uniform velocity correction.

Next, the magnification correction data will be described below by referring to FIGS. 16 to 18.

FIG. 16 illustrates a format of magnification correction data stored in the RAM 37 in the mechanical controller 33. As shown in FIG. 16, the magnification correction data is stored as the number of clock pulses with the short period or long period to be generated in each section. Here, for example, the number of all dots formed in one scanning operation is 40. All the dots are divided into four sections 1 to 4 each formed of 10 dots.

That is, increase/decrease information (1-byte) designating expansion or contraction of each section as well as information (2-byte) regarding the number of long dots or short dots to be set in a section which is expanded or contracted are stored as magnification correction data in addresses 0 to 31 designating four sections 1 to 4 for respective colors printed in the printing units 10Y, 10M, 10C and 10BL.

Here, the concrete technique creating magnification correction data regarding yellow (Y) will be described below by referring to FIGS. 17 and 18.

Figure 17:
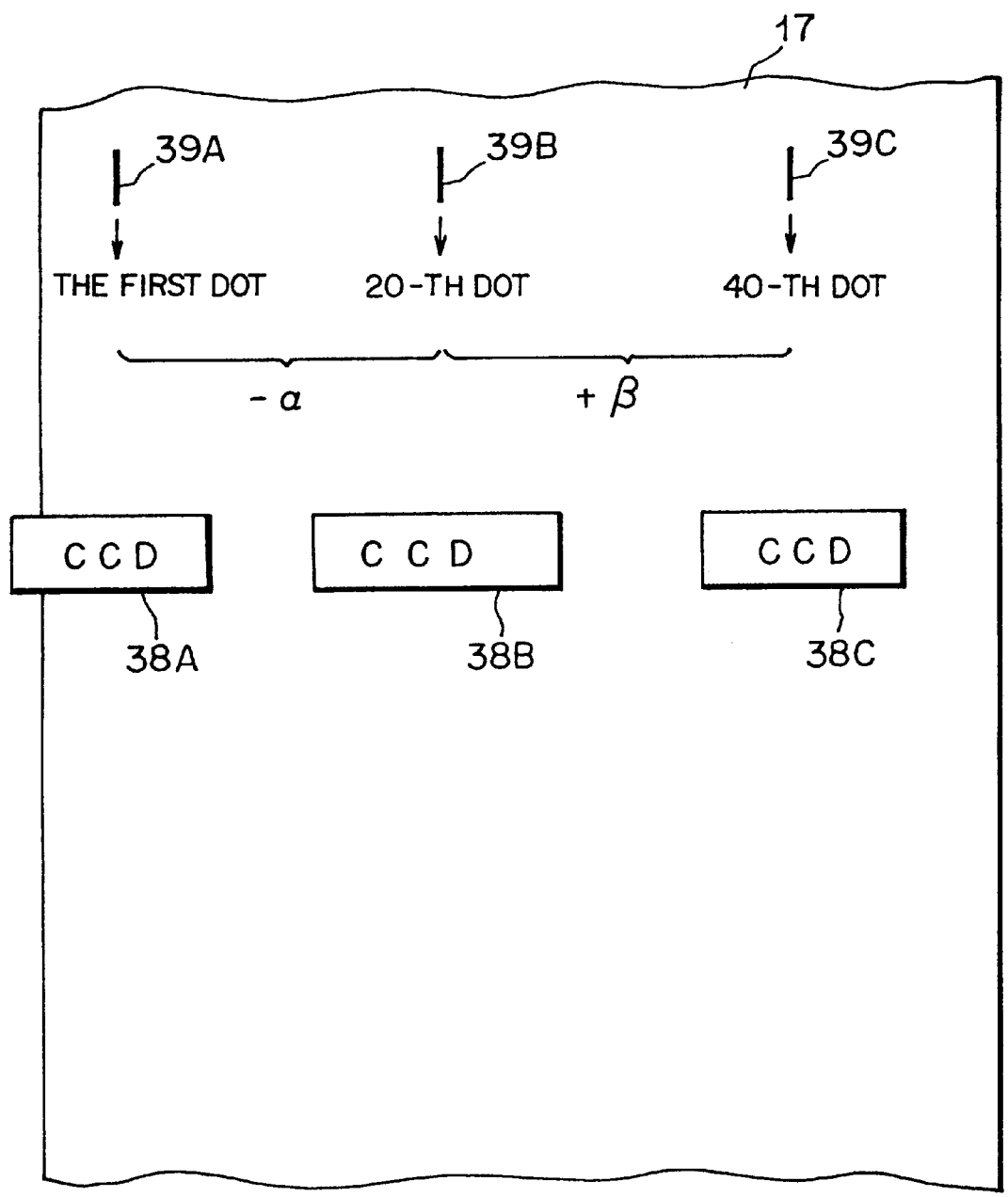
FIG. 17 is a diagram used for explaining the technique of creating magnification correction data according to the present embodiment.
Figure 20A:
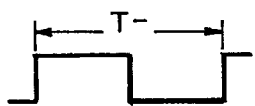
FIG. 20(a) to 20(e) are waveform diagrams each showing a modified example of an image clock pulse chain generated by a video clock generator (image clock generating unit) in the present embodiment.
Figure 20B:
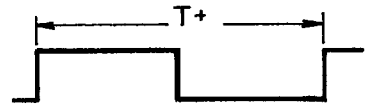
Figure 20C:
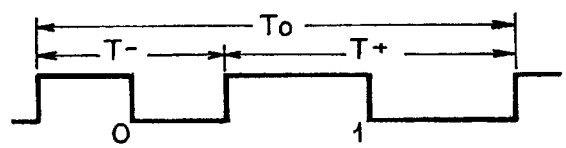
Figure 20D:
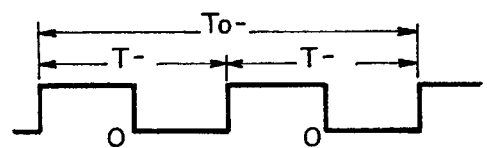
Figure 20E:
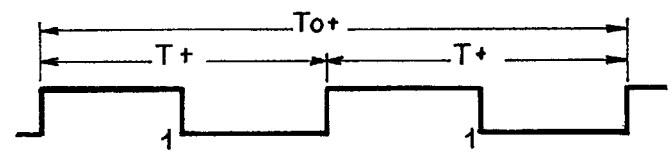

As shown in FIG. 17, during a job waiting period of the device in operation, the printing unit 10Y creates images 39A to 39C each with one dot width at the three positions (the first dot, the 20-th dot and the 40-th dot) on the transfer belt 17 in the main scanning direction. If there is no magnification error in the printing unit 10Y, the three images 39A to 39C are spaced at known predetermined intervals.

The CCD cameras 38A to 38C photograph respectively the images 39A to 39C while the endless transfer belt 17 returns from the side of the fixer 16 to the side of the printing unit 10Y. The CPU 36 finds the variation of the interval between the images 39A and 39B and the interval between the images 39B and 39C shifted with respect to a known predetermined interval, based on the result of the photographing operation.

For example, as shown in FIG. 17, when the interval between the images 39A and 39B is shorter than the predetermined interval by α and the interval between the images 39B and 39C is longer than the predetermined interval by β, the CPU 36 finds the number $\alpha_0$ of long dots to be formed in the sections 1 and 2 in order to expand the sections 1 and 2 printed in the printing unit 10Y by α as well as the number $\beta_0$ of short dots to be formed in the sections 3 and 4 in order to contract the sections 3 and 4 printed in the printing unit 10Y by β.

The number $\alpha_0$ of long dots in the sections 1 and 2 as well as the number $\beta_0$ of short dots in the sections 3 and 4 thus obtained are equally distributed in the sections 1 to 4, for example, as shown in FIG. 18. That is, the magnification correction data is created in the RAM 37 to form long dots of $\alpha_0/2(=1)$ in each of the sections 1 and 2 (addresses 0 and 1) for the color Y and to form short dots of $\beta_0/2(=2)$ in each of the sections 3 and 4 (addresses 2 and 3) for the color Y. In the increase/decrease column shown in FIG. 18, the sign + represents expanding a section while the sign − represents contracting a section.

The CPU 41 in the print controller 31Y expands the magnification correction data for Y color thus created from the RAM 37 to the RAM 44 in the print controller 31Y and then piles up it on the uniform velocity correction data shown in FIG. 12. Thus, as to the surface 1 of the polygon mirror 24, clock designation information ("00", "01", "00") of 2 bits are expanded for each dot, as shown, for example, in FIG. 19.

In a manner similar to that above-described, the magnification correction data on each of the colors (M, C, BL) other than color (Y) is created and then stored in the RAM 37 of the mechanism controller 33.

As described above, according to an embodiment of the present invention, a fine laser beam irradiation position control can be achieved based on the uniform velocity correction data, in consideration with the surface accuracy error of each mirror surface 24a of the polygon mirror 24. Since the uniform velocity error can be surely compensated based on variations in characteristic of each optical unit 13, the color image printing can be realized in high quality.

Installation error of the optical unit 13 and magnification error caused by the device frame deformation due to environmental changes are reflected at all times to the magnification correction data. The magnification correction data is piled up on the uniform velocity correction data, without adversely affecting the uniform velocity correction data. The magnification correction and the uniform velocity correction are achieved simultaneously and certainly. Therefore, the print quality of a color image can be further improved.

According to the present embodiment, the position correction can be performed at a resolution of ±1/2n dots (where n: a correction unit (ratio of an original oscillating frequency to a video rate)) to various error factors including a surface accuracy error of the polygon mirror 24, a uniform velocity error of each of fθ lenses 25 and 26, an installation error of the optical unit 13 and a frame deformation error due to environmental changes. For example, when a resolution is 600 dpi (one dot=42.3 μm) and the correction unit n is 10, the position correction can be performed at an accuracy of ±2.12 μm. Hence, in the electro-photographic printer 1A, the color slurring can be suppressed within ±2.12 μm by correcting the print deviation of each color. As a result, the color image can be formed in very high quality.

As described in the present embodiment, the amount of data held can be greatly compressed by holding uniform velocity correction data and magnification correction data as the number of clock pulses with the short period or long period to be generated in each section to each of the ROMs 40Y, 40M, 40C and 40BL and the RAM 37. This feature contributes to reducing the use memory capacity and the device manufacturing cost.

As described above, the correction unit has a very small value, or 1/n dots (4.23 μm when the resolution is 600 dpi and n=10). Hence, when the uniform velocity correction data is created according to the technique shown in FIG. 8, the visual field of each of the cameras 47-1 to 47-5 viewing the laser beam scanning position becomes so small that it is difficult to enter a spotlight in the visual field of each of the cameras 47-1 to 47-5 at the time of beginning adjustment. Hence, in order to create uniform velocity correction data, the spotlight may be photographed by first making a coarse adjustment by means of a camera with a low resolution and then making a fine adjustment by means of a camera 47-1 to 47-5 with a high resolution.

In the above-mentioned embodiment, it has been explained that the video clock generator 45 generates three types of clock pulses including a clock pulse with the reference period, a clock pulse with the short period and a clock pulse with the long period and then adds 2-bit data designating the type of clock pulse for one dot. The video clock generator 45 may selectively generate as a video clock pulse either a clock pulse with a short period T− or a clock pulse with a long period T+, as shown in FIGS. 20(*a*) and 20(*b*).

In this case, the uniform velocity correction data (or magnification correction data) is added as information (one bit data: "0" or "1") designating either a clock pulse with the short period T− or a clock pulse with the long period T+ for one dot.

As shown in FIG. 20(*c*), one reference length corresponding to the reference period $T_0$ can be realized as a set of a clock pulse with the short period T− and a clock pulse with the long period T+ by two dots formed of a short dot and a long dot. As shown in FIG. 20(*d*), the contracted state with the length which is shorter than the reference length, corresponding to the period $T_0$− shorter than the reference period $T_0$, can be realized by serially continuing the clock pulses with the short period T−. In contrast, as shown in FIG. 20(*e*), the expanded state with the length which is longer than the reference length, corresponding to the period $T_0$+ longer than the reference period $T_0$, can be realized by serially continuing clock pulses of the long periods T+.

As described above, since the reference state, the contracted state and the expanded state are realized, the uniform velocity correction data can be created by merely providing one bit data as information designating the type of clock pulse chain for one dot. Hence, the data amount can be further reduced advantageously.

Moreover, in the above-mentioned embodiment, various concrete numeral examples have been listed including the case where 40 dots and 4 sections in total are selected in one scanning operation and the case where one section includes 20 dots. However, the present invention should not be limited only to those numerals.

What is claimed is:

1. A color image forming device for forming a color image on a surface of a sheet-like medium by overlapping images of various colors, comprising:

a plurality of optical systems, each including a laser light source for emitting a laser beam according to an image signal each color;

a plurality of photosensitive bodies, each having a surface to be exposed to the laser light beam, which is emitted from said laser light source of each said optical systems, to form an electrostatic latent image on the surface of the photosensitive body according to said image signal for each said color, each of said optical systems further including a rotary polygon mirror for scanning over the surface of said photosensitive body in a main scanning direction by deflecting the laser beam from said laser light source of each said optical system, and an f θ lens for fostering uniform-velocity scanning of the laser beam deflected by said rotary polygon mirror in the main scanning direction on each said photosensitive body;

a storage unit for storing uniform velocity correction data, which is previously created for each mirror surface of said rotary polygon mirror, for correcting a possible expansion or contraction distortion of said electrostatic latent image in the main scanning direction on each said photosensitive body due to at least a positional error of characteristic errors of each said optical systems including said f θ lens; and an image clock generating unit for generating, upon receipt of said uniform velocity correction data regarding each mirror surface of the individual rotary polygon mirror from said storage unit, which mirror surface is used at a scanning time, an image clock pulse having a period corresponding to said uniform velocity correction data.

2. The color image forming device according to claim 1, wherein said image clock generating unit generates selectively any one of three types of clock pulses consisting of a reference clock pulse having a reference period, a short clock pulse having a period shorter than said reference period, and a long clock pulse having a period longer than said reference period, each said image clock pulse defining a dot-length in the main scanning direction based on said uniform velocity correction data.

3. The color image forming device according to claim 2, wherein said uniform velocity correction data received from said storage unit by said image clock generating unit for said image is information given for every dot and designating any one among said reference, short and long clock pulses.

4. The color image forming device according to claim 3, wherein all dots formed in the main scanning direction on the surface of each said photosensitive body during one scanning operation by each mirror surface of said rotary polygon mirror are divided into two or more sections, and a prospective deviation between an actual boundary position and a reference boundary position in each of said sections is measured based on said positional error of the characteristics errors of each said optical system before each said optical system is installed in said device, said uniform velocity correction data being created in units of said sections based on said deviation.

5. The color image forming device according to claim 4, wherein said storage unit further comprises:

a uniform velocity correction data holding unit for holding therein said uniform velocity correction data as a number of said short or long clock pulses to be generated within each said section by said image clock generating unit; and an expanding unit for expanding said uniform velocity correction data, which is held in said uniform velocity correction data holding unit, as information designating the type of clock pulse for each dot into said storage unit when the color image is formed.

6. The color image forming device according to claim 5, wherein said expanding unit expands said uniform velocity correction data, which is held in said uniform velocity correction data holding unit, into said storage unit so as to allocate short or long dots uniformly according to said short or long clock pulses within each said section.

7. The color image forming device according to claim 5, wherein said expanding unit expands said uniform velocity correction data, which is held in said uniform velocity correction data holding unit, into said storage unit so as to allocate short or long dots at random according to said short or long clock pulses within each said section every time a scanning operation is performed with each mirror surface of the individual rotary polygon mirror.

8. The color image forming device according to claim 5, wherein said expanding unit expands said uniform velocity correction data, which is held in said uniform velocity correction data holding unit, into said storage unit so as to allocate short or long dots according to said short or long clock pulses at a similar position in the main scanning direction within each said section for a same character and to vary the allocation positions of short or long dots at random in each said section for every character.

9. The color image forming device according to claim 5, further comprising a magnification correction data holding unit for holding magnification correction data for correcting a magnification distortion of said electrostatic latent image in the main scanning direction, said expanding unit being operable to add information, which designates said short or long clock pulse, to a dot to which said reference clock pulse is designated according to said uniform velocity correction data, based on said magnification correction data read out from said magnification correction data holding unit, and then to superimpose said magnification correction data over said uniform velocity correction data in said storage unit.

10. The color image forming device according to claim 9, further comprising:

an image photographing unit for photographing images, which are formed using said photosensitive bodies for said various colors on a conveying belt, which carries said sheet-like medium, at different positions in the main scanning direction; and a magnification correction data creating unit for obtaining a variation in inter-image distance of said images which are photographed on said conveying belt by said image photographing unit, in the main scanning direction, creating said magnification correction data based on said obtained variation, and then storing said created magnification correction data in said magnification correction data holding unit.

11. The color image forming device according to claim 10, wherein said magnification correction data is held in said magnification correction data holding unit as the number of said short or long clock pulses to be generated within each said section.

12. The color image forming device according to claim 1, wherein said image clock generating unit generates selectively either a short-period clock pulse or a long-period clock pulse as each said image clock pulse defining a dot-length in the main scanning direction, based on said uniform velocity correction data, wherein said uniform velocity correction data is received from said storage unit by said image clock generating unit for said image signal is information given for every dot and designating either said short-period clock pulse or said long-period clock pulse, and wherein said uniform velocity correction data designating alternately said short-period and long-period clock pulses causes said image clock generating unit to generate said image clock pulses in a reference state, and said uniform velocity correction data continuously designating one of said short-period and long-period clock pulses instructs said image clock generating unit to generate said image clock pulses in a state expanded or contracted with respect to said reference state.

* * * * *